United States Patent
Chen et al.

(10) Patent No.: US 11,327,918 B2
(45) Date of Patent: May 10, 2022

(54) CPU HOT-SWAPPING

(71) Applicant: Intel Corporation, Santa Clara, CA (US)

(72) Inventors: Zhi Yong Chen, Shanghai (CN); Sarathy Jayakumar, Portland, OR (US); Yi Zeng, Shanghai (CN); Wenjuan Mao, Shanghai (CN); Anil Agrawal, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/041,519

(22) PCT Filed: Jun. 29, 2018

(86) PCT No.: PCT/CN2018/093592
§ 371 (c)(1),
(2) Date: Sep. 25, 2020

(87) PCT Pub. No.: WO2020/000354
PCT Pub. Date: Jan. 2, 2020

(65) Prior Publication Data
US 2021/0209052 A1 Jul. 8, 2021

(51) Int. Cl.
*G06F 13/40* (2006.01)
*G06F 9/4401* (2018.01)
*G06F 11/20* (2006.01)

(52) U.S. Cl.
CPC ........ *G06F 13/4081* (2013.01); *G06F 9/4405* (2013.01); *G06F 11/2038* (2013.01);
(Continued)

(58) Field of Classification Search
CPC ............... G06F 13/4081; G06F 9/4405; G06F 13/4022; G06F 11/2043; G06F 11/2046; G06F 11/2041; G06F 11/2038
See application file for complete search history.

(56) References Cited

U.S. PATENT DOCUMENTS 6,370,657 B1 * 4/2002 Jansen ................. G06F 11/0793
714/23
6,591,324 B1 * 7/2003 Chen ................... G06F 13/4081
710/300
(Continued)

FOREIGN PATENT DOCUMENTS

CN       101201758 A    6/2008
CN       102473169 A    5/2012
(Continued)

OTHER PUBLICATIONS

PCT International Search Report and Written Opinion of PCT/CN2018/093592 dated Mar. 27, 2019; 10 pages.

*Primary Examiner* — Glenn A. Auve
(74) *Attorney, Agent, or Firm* — Compass IP Law PC

(57) ABSTRACT

There is disclosed in one example a multi-core computing system configured to provide a hot-swappable CPU0, including: a first CPU in a first CPU socket and a second CPU in a second CPU socket; a switch including a first media interface to the first CPU socket and a second media interface to the second CPU socket; and one or more mediums including non-transitory instructions to detect a hot swap event of the first CPU, designate the second CPU as CPU0, determine that a new CPU has replaced the first CPU, operate the switch to communicatively couple the new CPU to a backup initialization code store via the first media interface, initialize the new CPU, and designate the new CPU as CPUN, wherein N≠0.

22 Claims, 17 Drawing Sheets

(52) U.S. Cl.
CPC ...... *G06F 11/2041* (2013.01); *G06F 11/2043* (2013.01); *G06F 11/2046* (2013.01); *G06F 13/4022* (2013.01)

(56) References Cited

U.S. PATENT DOCUMENTS

| | | | |
|---|---|---|---|
| 2002/0087614 A1* | 7/2002 | Kocev | G06F 13/4081 718/104 |
| 2007/0033315 A1* | 2/2007 | Nguyen | G06F 13/4027 710/302 |
| 2009/0089566 A1 | 4/2009 | Natu et al. | |
| 2014/0089700 A1* | 3/2014 | Chang | G06F 1/324 713/322 |
| 2017/0322616 A1* | 11/2017 | Hsiao | G06F 1/3228 |
| 2018/0129574 A1* | 5/2018 | Zhang | G06F 9/5027 |

FOREIGN PATENT DOCUMENTS

| | | |
|---|---|---|
| CN | 102520982 A | 6/2012 |
| WO | 2020000354 A1 | 1/2020 |

* cited by examiner

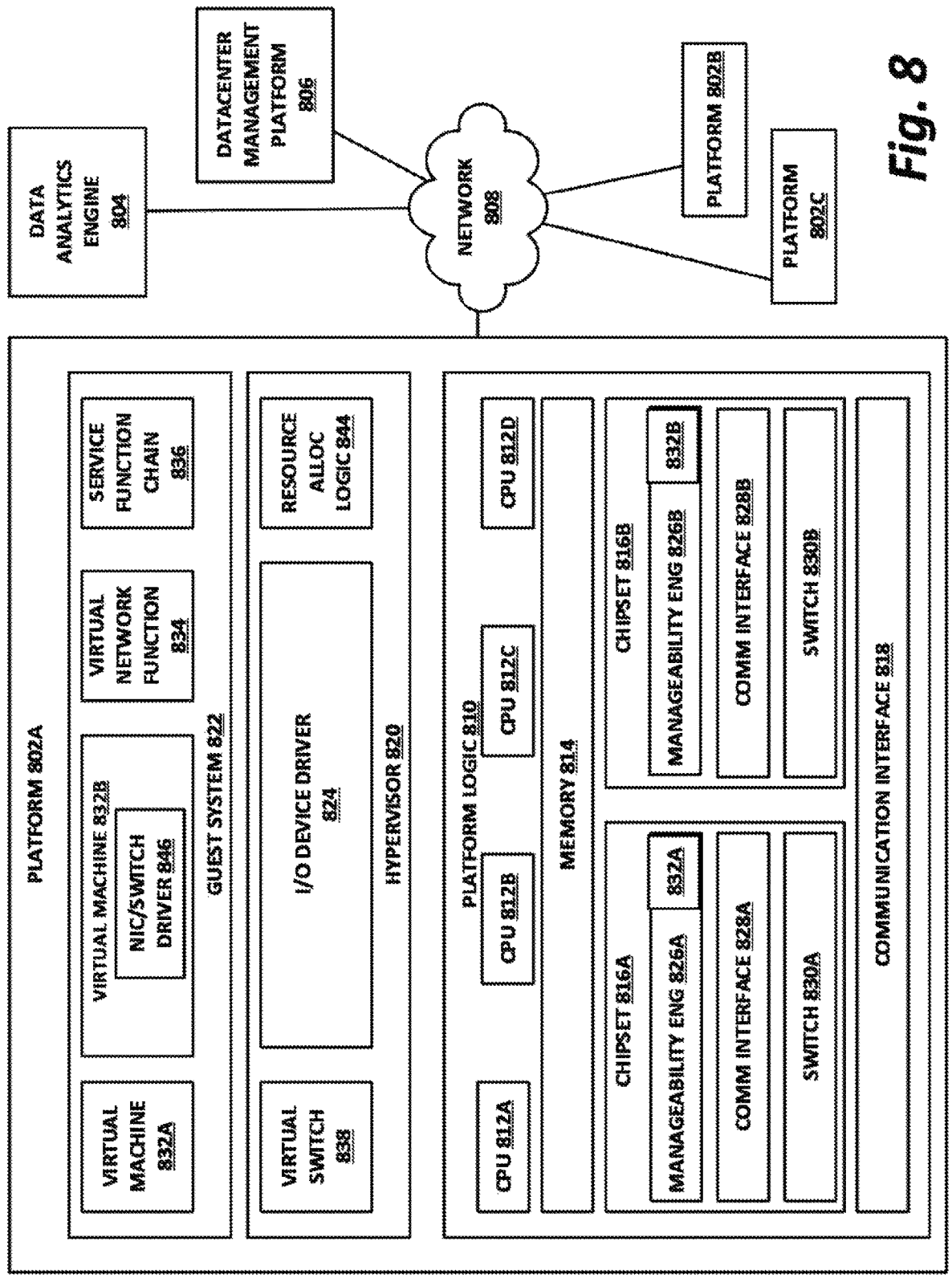

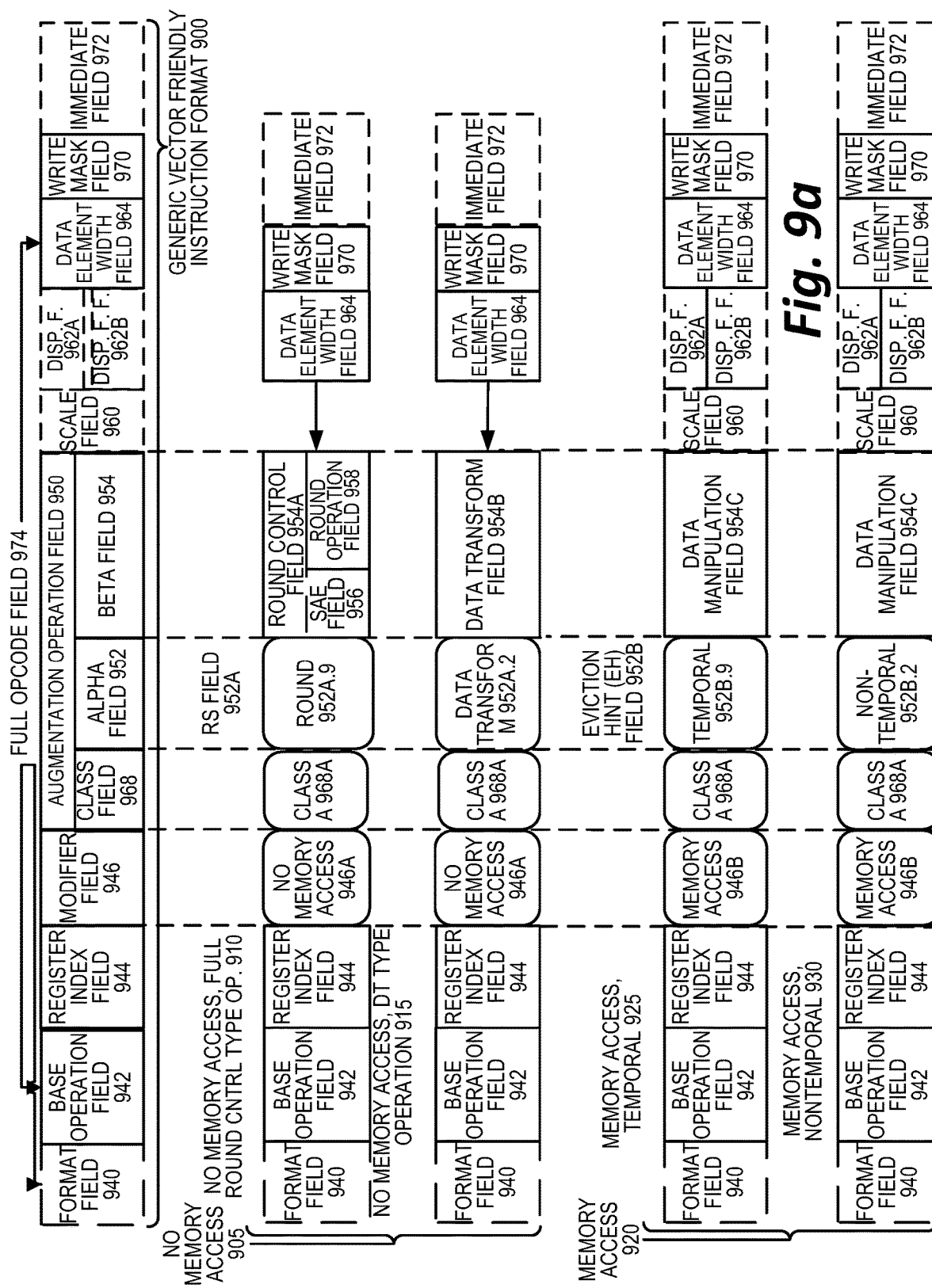

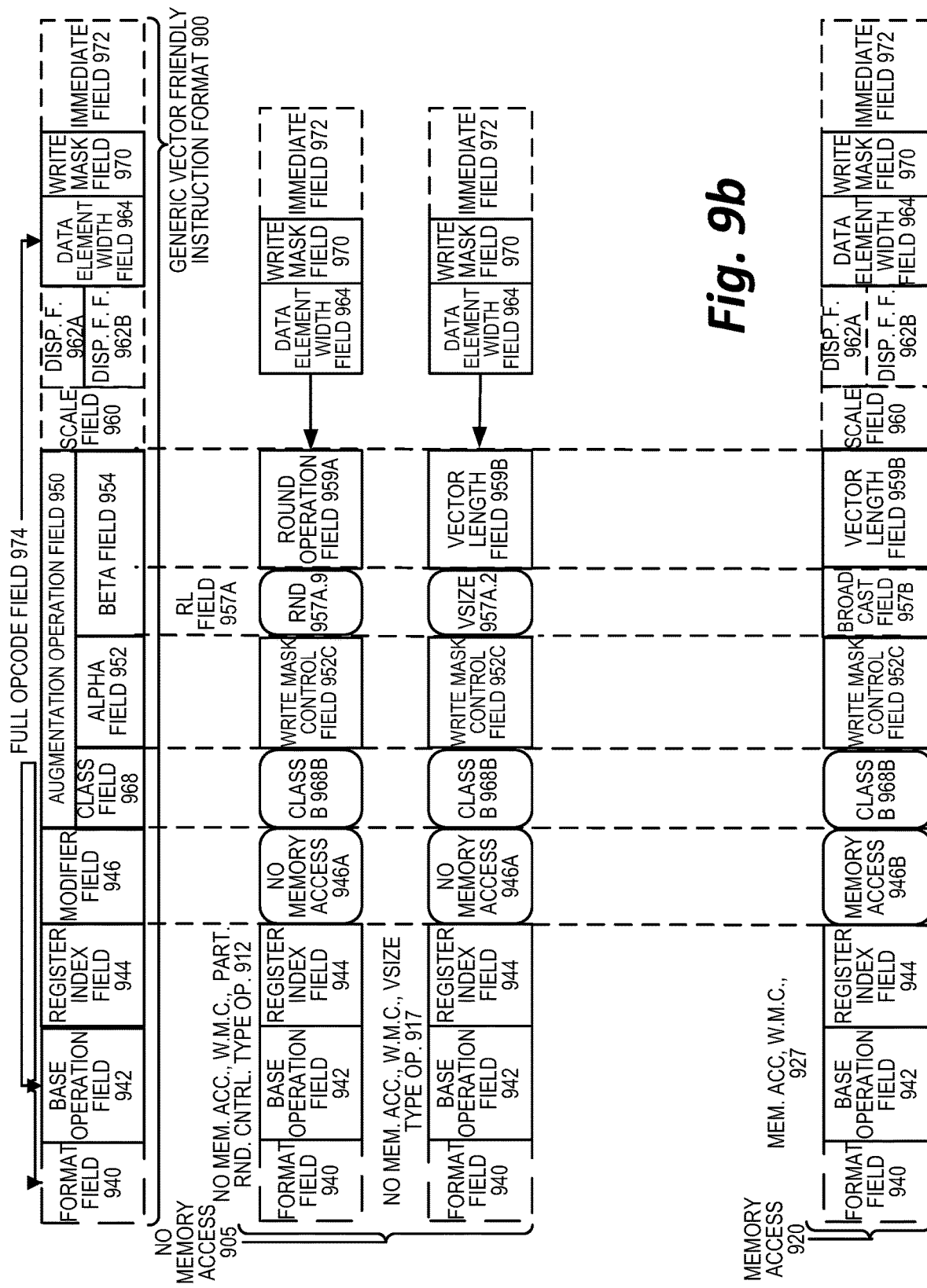

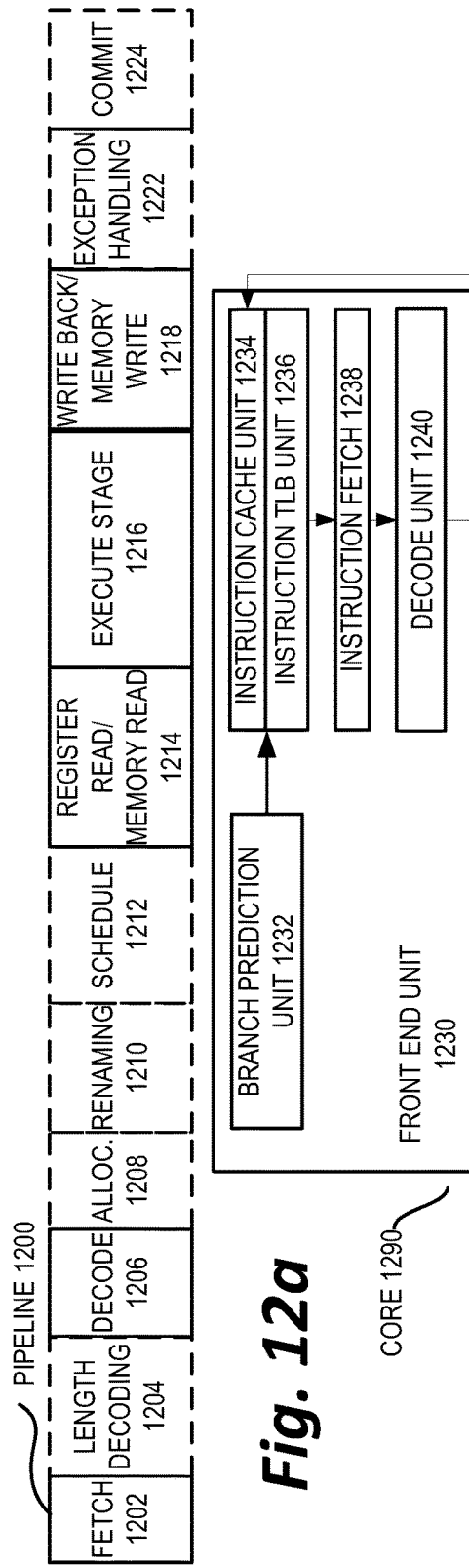
Fig. 12a
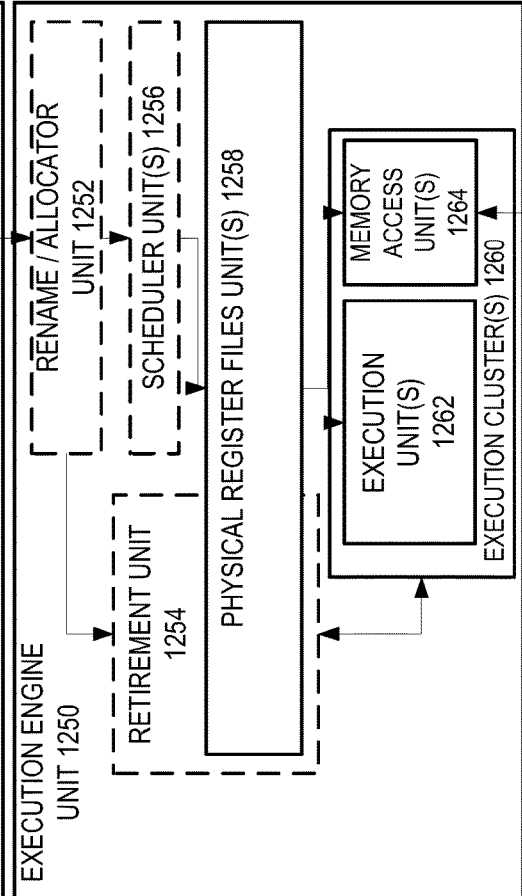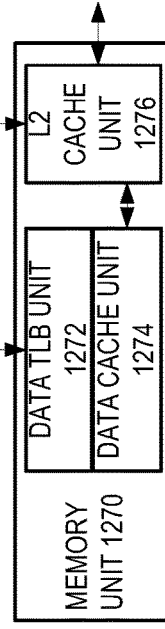
Fig. 12b

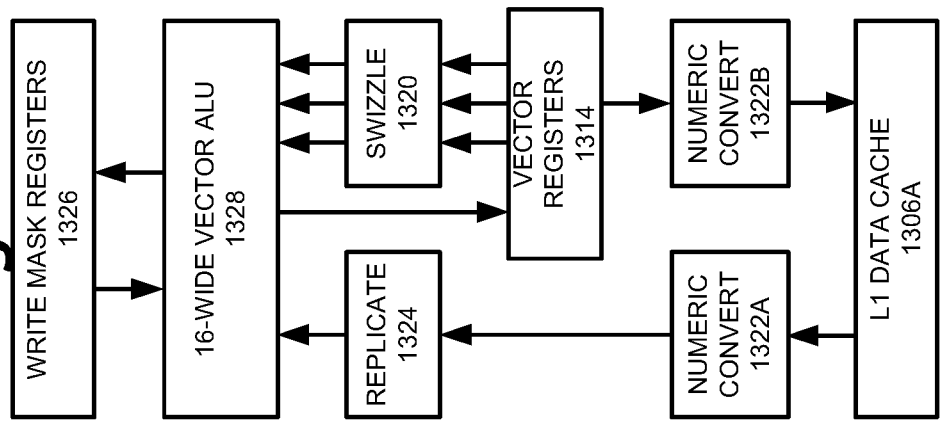
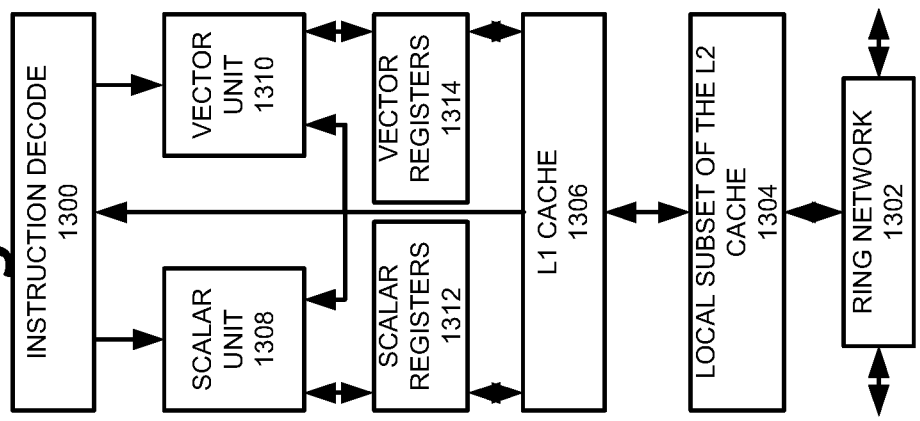

CPU HOT-SWAPPING

CROSS-REFERENCE TO RELATED APPLICATION

This application is a national stage application under 35 U.S.C. § 371 of PCT International Application Serial No. PCT/CN2018/093592, filed on Jun. 29, 2018 and entitled "CPU HOT-SWAPPING," which is hereby incorporated by reference herein in its entirety.

FIELD OF THE SPECIFICATION

This disclosure relates in general to the field of computing devices, and more particularly, though not exclusively, to a system and method for central processing unit (CPU) hot-swapping.

BACKGROUND

To increase reliability, availability, and serviceability (RAS) of hardware, some computing systems may provide the ability to "hot swap" certain components, treating those components as field-replaceable units (FRUs). In embodiments of the present specification, hot-swapping is the replacement of components in a computing system without shutting off power, or the need for a system-wide reset. An FRU is a circuit board or other computer logic assembly that can be easily replaced at the point of operation. When an FRU is hot swapped, it is changed out without requiring a reboot of the host system, which can be an important consideration in maintaining high availability.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIG. 8 is a block diagram of components of a computing platform, according to one or more examples of the present specification.

FIGS. 9a-9b are block diagrams illustrating a generic vector-friendly instruction format and instruction templates thereof, according to one or more examples of the present specification.

FIG. 12a is a block diagram illustrating both an example in-order pipeline and an example register renaming an out-of-order issue/execution pipeline, according to one or more examples of the present specification.

FIG. 12b is a block diagram illustrating both an example of an in-order architecture core and an example register renaming an out-of-order issue/execution architecture core to be included in a processor, according to one or more examples of the present specification.

FIGS. 13a-13b illustrate a block diagram of a more specific in-order core architecture, which core would be one of several logic blocks (including other cores of the same type and/or different types) in a chip, according to one or more examples of the present specification.

EMBODIMENTS OF THE DISCLOSURE

Figure 1:
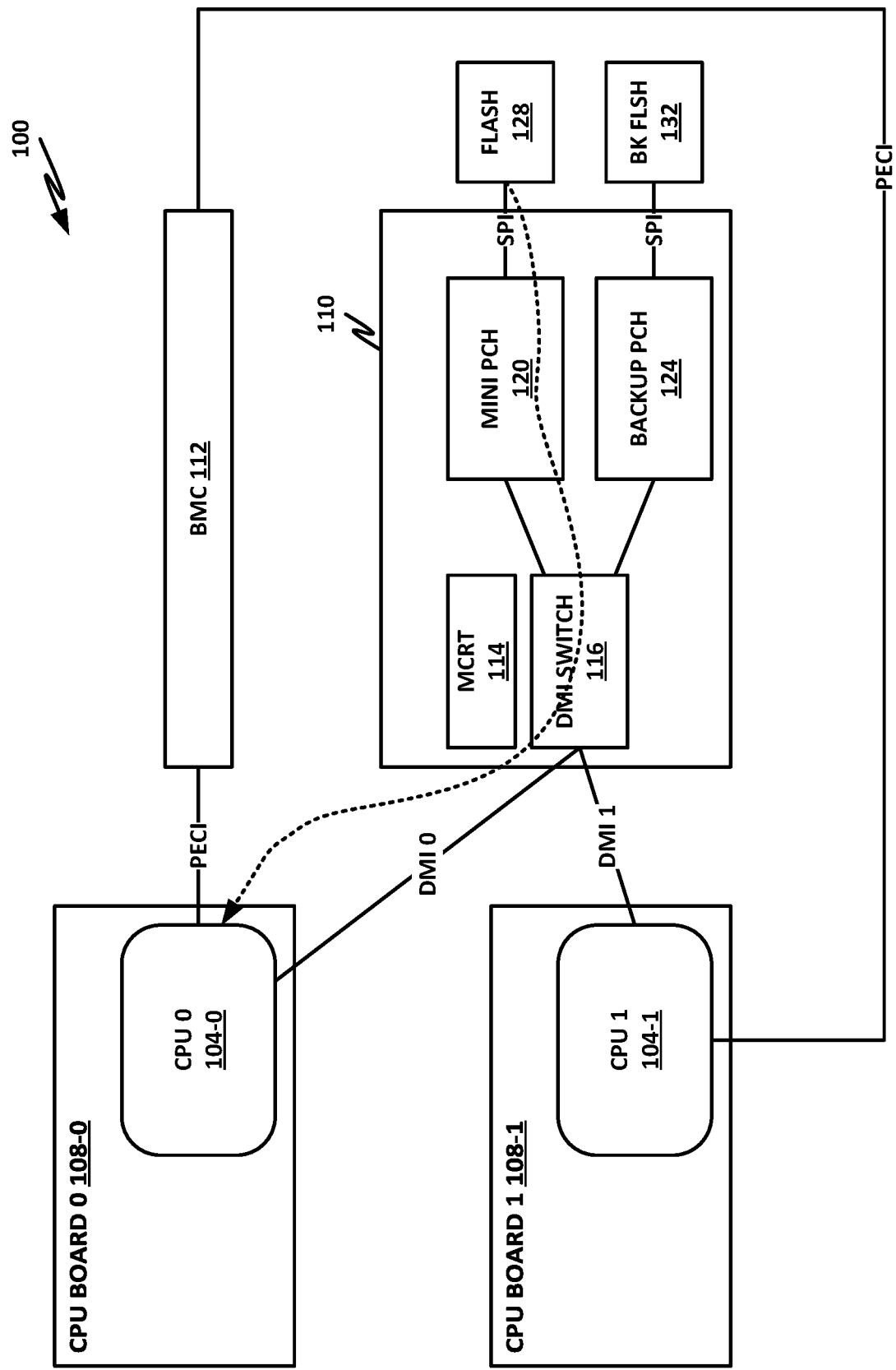
FIG. 1 is a block diagram of a computing system designed to support a hot-swappable CPU0, according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A contemporary computing platform, such as a hardware platform provided by Intel® or similar, may include a capability for monitoring device performance and making decisions about resource provisioning. For example, in a large data center such as may be provided by a cloud service provider (CSP), the hardware platform may include rack mounted servers with compute resources such as processors, memory, storage pools, accelerators, and other similar resources.

As used herein, a "cloud" is a communications network that connects computing resources in a disaggregated fashion. A cloud may be implemented either by way of public, wide area network (WAN) resources such as the Internet, or privately as within an organization using a local area network (LAN). "Cloud computing" includes network-connected computing resources and technology that enables ubiquitous (often worldwide) access to data, resources, and/or technology. Cloud resources are generally characterized by great flexibility to dynamically assign resources according to current workloads and needs. This can be accomplished, for example, via virtualization, wherein resources such as hardware, storage, and networks are provided to a virtual machine (VM) via a software abstraction layer, and/or containerization, wherein instances of network functions are provided in "containers" that are separated from one another, but that share underlying operating system, memory, and driver resources.

As used in the present disclosure, a VM is an isolated partition within a computing device that allows usage of an operating system and other applications, independent of other programs on the device in which it is contained. VMs, containers, and similar may be generically referred to as "guest" systems.

A high-availability (HA) or mission-critical computing system such as a server may require central processing unit (CPU) hot-plugging. This includes swapping out a CPU on a live, running system. In some contexts, CPU hot-swappability is required as part of a non-stop operation specification for mission-critical systems. Thus, the CPU (or CPU board) may be treated as a field-replaceable unit (FRU). Hot-swapping can include swapping out a CPU (e.g., by removing it from its socket and replacing it with a new CPU), or swapping out a CPU board, including the processor, memory, and other elements.

But in some existing systems, it is not possible to hot swap the so-called "legacy socket," or in other words CPU0 of the system. Because the legacy socket has special duties in the system hierarchy, hot-swapping would require a system reset—which would be unacceptable in some mission-critical or high-availability systems. This provides very limited options for repair in case of a CPU0 failure or upgrade. For example, a fully redundant system can be brought online and workload tasks can be transferred to the redundant system so that the original system can be rebooted. This solution is, however, expensive and cumbersome.

For example, a typical blade server may have four nodes with two CPUs each. In embodiments of the present specification, a blade server is a computing apparatus with a modular design configured to minimize the use of physical space and energy. A blade server may have at least some components removed to save space, minimize power consumption and address other considerations, while still having the functional components to perform its computing function. A blade system typically includes a blade enclosure, which can hold multiple blade servers, providing services such as power, cooling, networking, various interconnects and management. Together, blades and the blade enclosure, form a blade system. A 6U input/output unit (IOU) modular chassis may have, by way of nonlimiting example, eight, 16, or 32 blades in the single chassis. The "legacy blade" is where the basic input/output system (BIOS) is hosted (blade 0), containing CPU0. When a new blade is added, the new blade needs to boot and initialize its memory, which requires the BIOS. Thus, because CPU0 hosts the BIOS, swapping out CPU0 (or the whole legacy blade) is not feasible, as there is then no BIOS available to boot the new CPU.

Furthermore, even for CPU sockets that support hot-swapping, in some existing systems the CPU on-lining flow is unacceptably slow. The on-lining flow includes the process of training (e.g., initializing) the main memory. Initializing the main memory may require placing the new blade in system management mode (SMM) to train the memory.

In some cases, this involves a technique known as "system management interrupt (SMI) slicing." In SMI slicing, rather than sequentially booting the system and then going into SMM to train the memory, the SMI tasks may be divided into smaller slices. During the boot process, the system may go into and out of SMM to handle the individual tasks. Note that because SMM has a built-in timeout, the memory training may not be able to be performed in a single SMI. A full training cycle would cause the SMM to time out. So, it may be necessary to divide the memory training into multiple SMIs, breaking the tasks into smaller, modular tasks called slices. While the system boots, the system may go into and out of SMM to handle these smaller, modular SMI slices. This switching back and forth between SMM and operating system (OS) mode may extend the boot time for a new node or blade. So training or initializing memory can take an unacceptably long time.

Embodiments of the present specification provide for a hot-swappable CPU0, along with shortened memory training times by providing a dual platform controller hub (PCH) and a direct media interface (DMI) switch. As used in the present specification, a PCH is a set of components in an integrated circuit that controls the system clock, direct media interface, integrated graphics, and other support functions in an Intel® CPU or other architecture. DMI is an Intel® proprietary link between the Northbridge and Southbridge chips in the core logic of a PC motherboard.

One embodiment of the present specification uses a single, discrete field-programmable gate array (FPGA) to provide the dual PCH and DMI switch between legacy CPU0 and some other CPU, which may be a non-legacy CPU. In embodiments of the present specification, an FPGA is a species of configurable logic circuit in which gates can be dynamically arranged to realize logic that operates at speeds similar to those realized in integrated circuits. The dual PCH and DMI switch provided by the FPGA allows for more efficient memory training without the need for platform-specific optimization techniques to control the frequency of SMIs and duration of SMM residency. Rather, those can be determined according to specific system demands.

A system of the present specification may include a blade, rackmount server, or other computing system, with each blade or rackmount server including between one and eight CPU sockets, which each socket hosting a processor (often an enterprise-class processor such as an Intel® Xeon processor, or competing processors from other vendors, although other embodiments may use other processor families, such as Intel® Core, Pentium, Atom, Celeron, or other processors). Large systems may group up to four processor sockets into a "clump." Each clump may also include an integrated IO bridge ("Northbridge") and an integrated IO controller hub (ICH) ("Southbridge"). In newer systems, the Northbridge and Southbridge are deprecated, and have been replaced by a next-generation platform controller hub (PCH). An external node controller (XNC), defined as an interface for managing portions of a network configured to interact with external systems, may be used to group a plurality of clumps together into systems that support a large number of CPUs. For example, current Intel® Xeon® systems support up to 64 CPU sockets in 16 clumps, with each socket hosting a CPU having from 1 to 28 cores.

A PCH, Northbridge, Southbridge, and similar technologies from other vendors may be generically referred to as a "chipset," which provides a data flow management system (DFMS) between the processor and external devices. Chipsets evolve over time, and the use of the term "chipset" throughout this specification and the appended claims should be understood to encompass known chipsets and future innovations that may take the place of a chipset. Throughout the remainder of this specification, a PCH is used as an example of a chipset, but the PCH is used in this context only as an illustrative and nonlimiting example. The PCH illustrated herein should be understood to stand for the entire genus of chipsets. Similarly, a direct media interface (DMI) is used as an example of a media interconnect, and should be understood to stand for the entire genus. Other media interconnects include PCI, PCIe, or any other network or fabric. A blade is used throughout this specification to stand in for the entire genus of multi-CPU computing systems, which may include blades, standalone servers, rackmount servers, workstations, desktop computing systems, embedded systems, or other computing systems.

A system according to the present specification may use a dynamic partition concept to contain CPU or memory errors within dual PCHs. This supports an XNC with clump-level BIOS boot up and multi-partition dynamic merging. This can be used to achieve faster CPU on-lining, while also supporting CPU0 hot-swapping. This is simpler and faster than SMI based on-lining via the SMI slicing technique. The DMI switch can switch the DMI and legacy resources between a good and a bad CPU without a reset, thus making the legacy CPU (CPU0) hot-pluggable.

Embodiments of the present specification are described in terms of a discrete FPGA that implements dual "mini PCHs" Intel® Legacy Block (ILB) and a DMI switch. As used in this specification, the ILB is a version of a PCH that may have reduced functionality. For example, the ILB may include only the PCH functionality required to boot a CPU. The ILB may be implemented on an FPGA. However, it should be noted that the system could also be implemented in an application-specific integrated circuit (ASIC), as an intellectual property (IP) block, as part of a system-on-a-chip (SoC), or could be controlled by other logic including specialized software running on a processor or a coprocessor.

By providing a hot-pluggable CPU0, greater flexibility is provided to end users who require CPU hot-plugging capabilities, while also reducing the time for servicing of an FRU. The system also makes the process of memory training much more efficient, thus reducing downtime and improving availability. In cases of mission-critical systems with large memory capacity, memory on-lining can take several hours.

Furthermore, the teachings of the specification can make the CPU hot plug process more widely used, so that the BIOS and operating system can be more fully validated and quality can be improved as real world results are observed more broadly in the field.

In systems where reliability, availability, and serviceability (RAS) is a concern, hot-swappable legacy sockets can significantly reduce the downtime of a system, and can essentially eliminate the downtime altogether, because every component can be treated as an FRU.

By way of illustration, a hot-swappable legacy socket may be provided at the CPU board level. An FPGA, ASIC, IP block, or other logic element may provide a DMI switch to provide DMI multiplexing between the processor and the PCH at boot time. The CPU may boot up with DMI, and then disconnect from the DMI after the memory reference code (MRC) initializes memory at boot up. In embodiments of the present disclosure, the MRC is a component of the BIOS in computers with Intel® motherboards, responsible for setting read/write protocols in random access memory (RAM) and regulating other basic memory functions.

The dual PCHs of the present specification can be used to boot up independently and then merge resources after MRC. The baseboard management controller (BMC) may then be used to program the message channel routing table within the CPU board without requiring reset. The register programming interface can use, for example, a platform environment control interface (PECI) and/or BMC joint test action group (JTAG). For purposes of the present disclosure, a BMC is an interface allowing for computer subsystem management, independent of a host system's CPU. JTAG is an industry standard which provides for testing and verifying performance of printed circuit boards after the manufacturing process is concluded. The BMC may require the system to enter quiescent mode before programming the message channel routing table. The system BIOS may be placed in BMC_INIT mode.

A system and method for CPU hot-swapping will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of a computing system 100 designed to support a hot-swappable CPU0, according to one or more examples of the present specification.

Note that system 100 could be a blade server, a rackmount server, a standalone server, or any other computing system as described in this specification. In this case, system 100 includes CPU board 0 108-0 and CPU board 1 108-1. For example, CPU boards 108 could be individual processor blades, with each blade being an FRU. Each individual blade could host more than one CPU 104. Thus, although in this example a single CPU 104 is shown on each CPU board 108, an individual CPU board 108 could also host a plurality of CPUs, including one or more CPU clumps. In the case of a blade server, CPU board 0 108-0 may be considered to be the "legacy blade."

Because CPU board 0 108-0 hosts CPU 0 104-0 (i.e., the "legacy socket"), according to certain prior art architectures, CPU board 0 108-0 and CPU 0 104-0 would not be hot-swappable. To replace CPU board 0 108-0, or CPU 0 104-0, a system reset may be required. This would be unacceptable for some high-availability or other critical applications, and thus may require expensive workarounds.

Each CPU 104 may communicate with outside devices via a chipset 110. As described above, a chipset 110 may include a DMI, a Northbridge, a Southbridge, a PCH, or other similar technology. In this illustrative example, CPUs 104 communicate with chipset 110 via a DMI that is controlled by a DMI switch 116. In this case, CPU board 0 108-0 communicates via bus DMI 0, while CPU board 1 108-1 communicates via bus DMI 1. The chipset 110 includes a "mini PCH" 120, which is a PCH that provides only some of the ordinary PCH capability. A mini PCH may be used so that mini PCH 120 can coexist on an FPGA or other device along with a backup PCH 124 and the logic for DMI switch 116. Mini PCH 120 communicates via SPI with a flash memory 128, while backup PCH 124 communicates via SPI with backup flash 132.

In certain embodiments, mini PCH 120 and backup PCH 124 are logically identical, while flash 128 and backup flash 132 have stored thereon identical boot code. Thus, flash 128 and backup flash 132 can both operate as a boot store, which may include operating system boot code, a BIOS, or other code that can be used to initialize a CPU 104 when it is brought online.

In some existing systems, a single CPU 0 104-0 would be communicatively coupled via a single DMI bus to a PCH and a flash or other boot store containing initialization code for the CPU. If some other CPU in the system (i.e., a CPUN where N≠0) were to be hot swapped, then CPU 0 104-0, occupying the legacy socket and having access to the BIOS boot code, could initialize the new CPU, for example via SMI slicing. However, if CPU0 were hot swapped, then there would be no initialized CPU with access to the boot store that could initialize the CPU.

In this case, by providing a DMI switch 116 rather than a single DMI bus, and by providing a redundant backup PCH 124 and a backup flash 132, it is possible to initialize CPU 0 104-0 if it is hot swapped. For example, to start with, CPU 0 104-0 is communicatively coupled via DMI switch 116 to mini PCH 124 and flash 128. A message channel routing table (MCRT) 114 controls the routing within DMI switch 116. CPU board 0 108-0 and CPU board 1 108-1 communicate with a baseboard management controller 112, for example via PECI.

Figure 2:
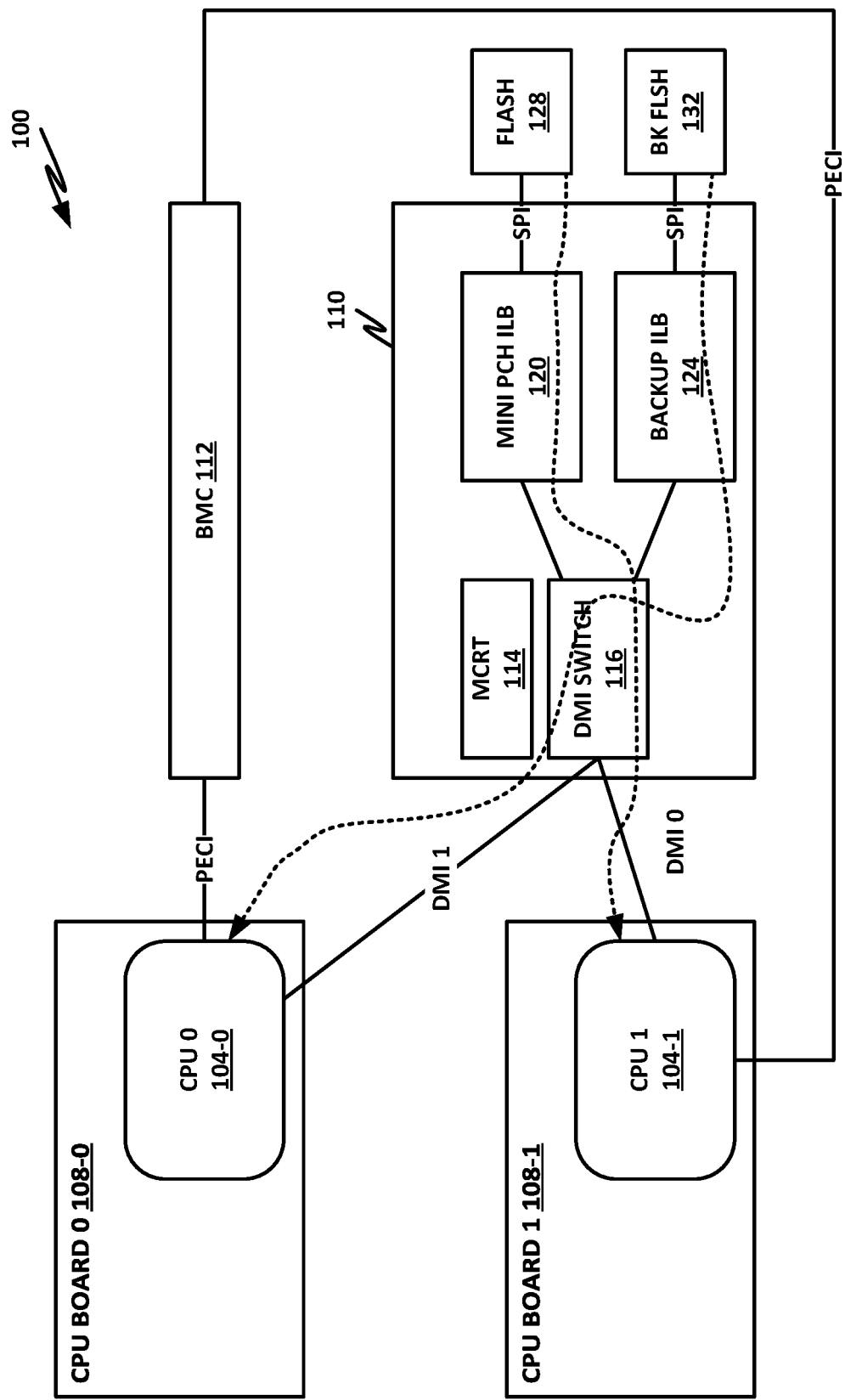
FIG. 2 is a further block diagram of a system with a hot-swappable central processing unit (CPU), according to one or more examples of the present specification.

FIG. 2 is a further block diagram of a system with a hot-swappable CPU, according to one or more examples of the present specification.

In the case of FIG. 2, the system may detect a hot swap event for CPU board 0 108-0 or for CPU 0 104-0. In the case of this hot swap event, MCRT 114 may be reprogrammed to communicatively couple flash 128 and mini PCH 120 to CPU 1 104-1 on CPU board 1 108-1. So, while in a normal boot mode, flash 128 would be communicatively coupled via mini PCH 120 and DMI switch 116 to CPU 0 104-0 via DMI 0, to support hot swap of the legacy socket, the routing is changed. DMI 0 now communicatively couples to CPU 1 104-1, while DMI 1 communicatively couples to CPU 0 104-0. CPU 0 104-0 is now communicatively coupled to backup PCH 124 and backup flash 132. CPU 1 104-1 is now communicatively coupled to mini PCH 120 and flash 128.

CPU board 1 108-1 may now be designated as the legacy board (e.g., the legacy blade), and CPU 1 104-1 may now be designated as CPU0, for example via setting socket ID (SktID) general purpose input/output (GPIO) to 0.

Once CPU 1 104-1 has been designated as CPU0, then the old CPU 0 104-0 may be designated as a CPU N wherein N≠0. For example, it may be set to SktID=2. Because CPU0 no longer acts as the legacy socket, it may now be brought offline.

At this point, the system has essentially been divided into two small partitions. Each partition contains one DMI, one PCH, and a flash. The rest of the system continues to operate under the control of CPU 1 104-1, which now functions as CPU0, while CPU 0 104-0 now exists in an independent partition. Once a new CPU has populated the socket of CPU 0 104-0, CPU board 108-0 is powered on and the new CPU fetches the boot code from its own backup flash 132 via backup PCH 124. At this time, the new CPU 0 104-0 performs all of its initialization and training. Even if this training is time-consuming, it is not a bottleneck for the rest of the system, because CPU board 0 108-0 now exists essentially in its own dedicated partition of the system. Once CPU 0 104-0 is completely initialized, system 100 may merge CPU 0 104-0 into the main system partition. Once the new CPU 0 104-0, along with all of its memory and I/O is initialized, DMI switch 116 can switch back to a "normal" boot mode, with the SPI being directed to flash 128. Note that the embodiment disclosed in FIGS. 1 and 2 assumes a CPU board-level hot plug capability (i.e., CPU, memory, and IIO), which is available on certain existing systems except for CPU board 0.

Some embodiments of system 100 may provide DMI switch 116 in an FPGA to perform DMI multiplexing between the processor and the chipset.

Furthermore, certain embodiments of the present specification may provide the ability to add a second PCH, and/or boot store in a hot swap fashion, so that the ability to hot swap CPU0 may itself be "hot swapped" into production systems without rebooting them. This allows an upgrade path for existing systems without disruption of services.

In some embodiments, a CPU may also boot up with DMI and then disconnect the DMI after MRC. This result has been verified on an XNC BIOS with a multi-clump boot up flow.

Discrete FPGAs may be used to implement mini PCH 120 and/or backup PCH 124. As discussed above, if less than the full PCH is provided, it is possible to provide both mini PCH 120 and backup PCH 124 on a single FPGA, thus saving on deployment costs.

The dynamic partitioning concept is supported by BMC 112, which has the ability to reprogram MCRT 114 within CPU boards without requiring a reset. The register programming interface can use PECI and/or BMC JTAG. In some embodiments, BMC may request the system to enter quiescent mode before programming MCRT 114. The system BIOS may be accessed in BMC_INIT mode.

Also note that a separate, discrete FPGA may be used to implement DMI switch 116, although with enough gates, DMI switch 116, mini PCH 120, and backup PCH 124 could all be provided on a single FPGA.

Advantageously, the embodiment disclosed herein provides the ability to switch the PCH DMI between CPUs at runtime with a live OS, and without a reset.

Figure 3:
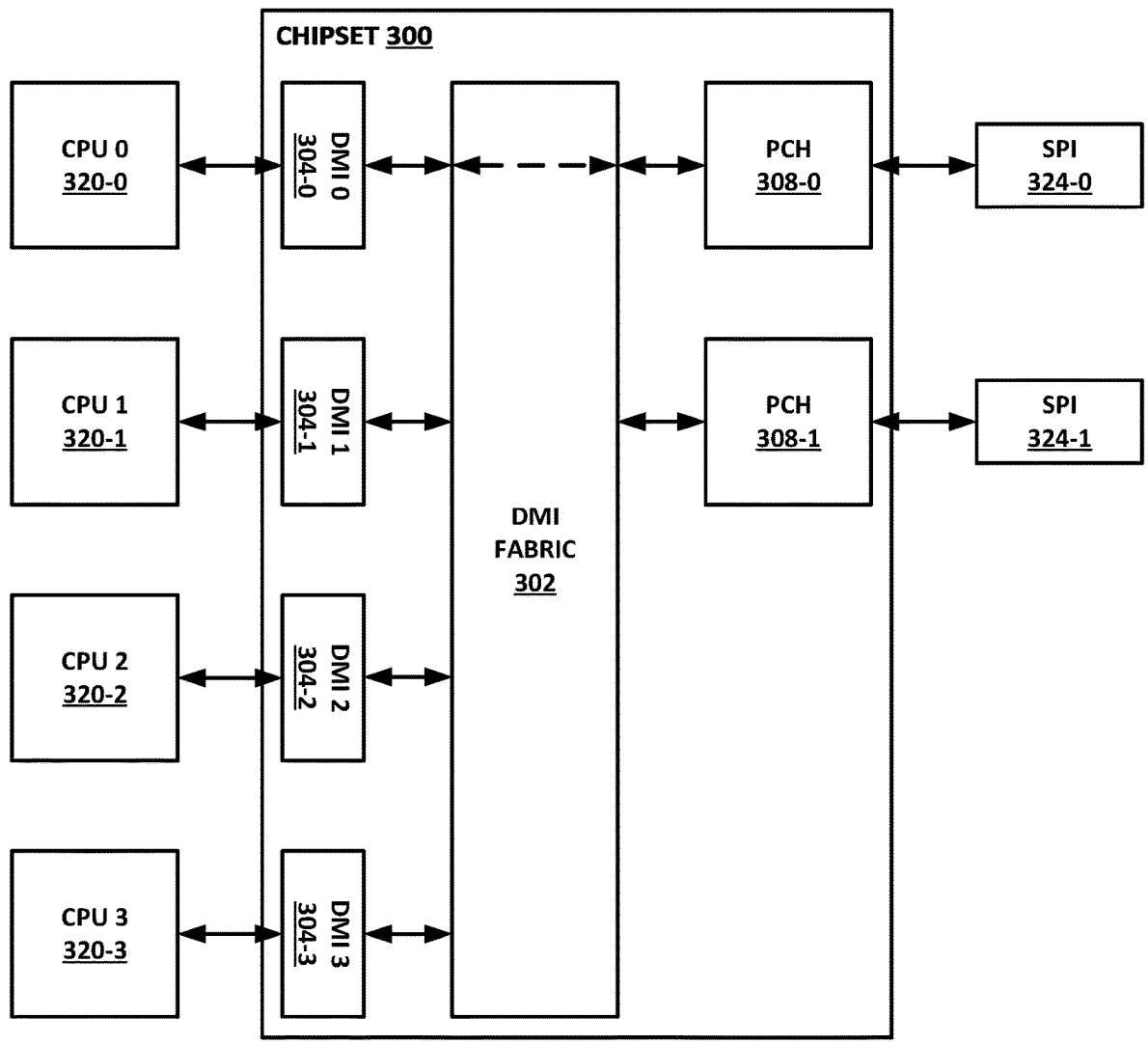
FIGS. 3-4 are block diagrams illustrating the use of a direct media interface (DMI) fabric, according to one or more examples of the present specification.
Figure 4:
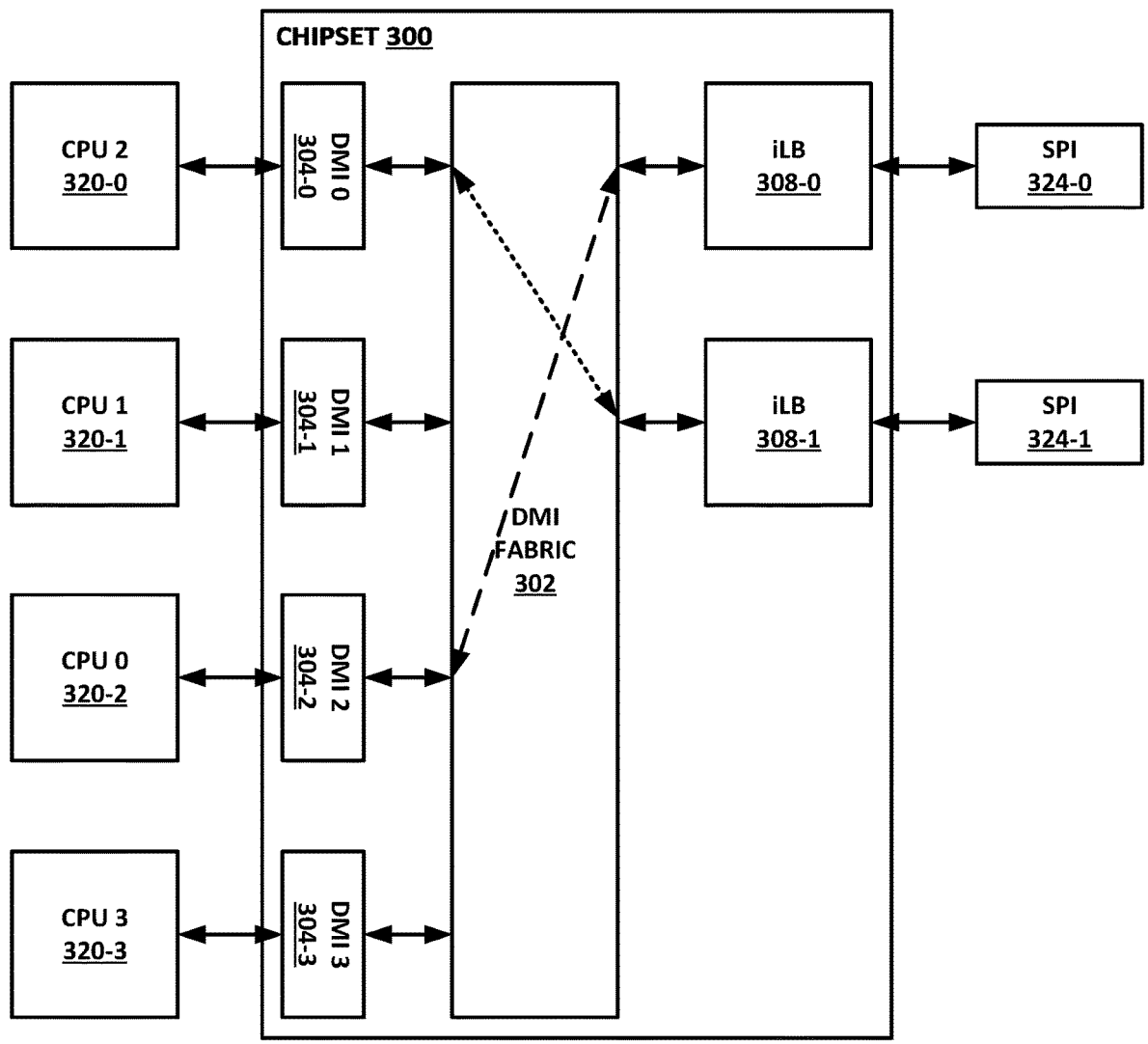

FIGS. 3-4 are block diagrams illustrating the use of a DMI fabric, according to one or more examples of the present specification.

The examples illustrated in FIGS. 3-4 may be used in any of the embodiments disclosed herein. In both of these illustrations, an FPGA 300 is used to implement a switching DMI fabric 302 along with PCH 308-0 and PCH 308-1. In this illustration, a single FPGA 300 is shown, but it should be understood that a plurality of FPGAs 300 could also be programmed to perform the tasks illustrated herein. The number of supported functions depends on the number of gates available in the FPGA, as well as, in particular, the extent to which PCH 308 implements the full PCH protocol. In some examples, PCH 308 may be a limited PCH that provides only those functions necessary to boot from BIOS and/or an operating system.

In this illustration, PCH 308-0 provides an SPI port 324-0, while PCH 308-1 provides an SPI port 324-1. These can be used to communicatively couple to a boot store where boot instructions are stored.

By way of illustration, this system includes four CPUs, namely CPU 0 320-0, CPU 1 320-1, CPU 2 320-2, and CPU 3 320-3. In some cases, CPU 1 320-1, CPU 2 320-2, and CPU 3 320-3 would be hot-swappable according to prior art techniques. But CPU 0 320-0, occupying the legacy socket, would not be hot-swappable. This is because CPU 0 320-0 contains the link to PCH 308-0 and SPI 324-0. The code contained therein is necessary to initialize some CPUs. Thus, if CPU 0 320-0 goes offline as in a hot swap scenario, then the link to that code is lost, and the CPU cannot be initialized. But the inclusion of a DMI fabric 302 makes hot-swapping of CPU 0 320-0 possible.

As illustrated in FIG. 3, in normal operation, PCH 308-0 communicatively couples to CPU 0 320-0 via DMI 0 304-0. CPU 1 320-1 communicatively couples to DMI 1 304-1.

CPU 2 320-2 communicatively couples to DMI 2 304-2, and CPU 3 320-3 communicatively couples to DMI 3 304-3. During this normal operating embodiment, DMIs 304-1, 304-2, and 304-3 may remain in an idle state.

But as illustrated in FIG. 4, upon initiation of a hot swap of CPU 0 320-0, the routing within DMI fabric 302 is changed. For example, a BMC as illustrated in FIG. 1 may operate an MCRT 114 to change the routing within DMI fabric 302. Responsive to the update to the MCRT 114, DMI fabric 302 changes its internal routes.

CPU 0 320-0 is now communicatively coupled to backup PCH 308-1 and from there to backup SPI 324-1. CPU 2 320-2 is now communicatively coupled to PCH 308-0 and from there to SPI 324-0. The SktID GPIO signal may then be used to designate CPU 2 320-2 as CPU0 as illustrated in FIG. 4. CPU 0 320-0 may then be designated as CPU 2 as further illustrated in FIG. 4.

Upon detecting a hot swap event of CPU 0 320-0, an appropriate entity such as a BMC may provide a control signal to FPGA 300 to indicate that a CPU is either online or offline. In this case, CPU 0 320-0 is offline, at which point the CPU can be swapped out. The system is now effectively partitioned. CPU 0 320-0 is offline and exists in its own partition, while CPUs 1 320-1, 2 320-2, and 3 320-3 are online and exist in a working partition. Because CPU 0 320-0 is in its own partition and does not act as a bottleneck against the rest of the system, CPU 0 320-0 can now be reinitialized and trained without an SMI slicing technique. Rather, CPU 0 320-0 can be booted according to normal procedures without affecting the rest of the system. Once CPU 0 320-0 is brought back online, it receives a SktID GPIO signal of CPU 2. Thus, the CPU in socket 320-0 now acts as CPU 2 for the system, while the CPU in socket 320-2 now acts as CPU0 for the system. An appropriate entity may then provide to FPGA 300 an online signal, which indicates that CPU 0 320-0 is now to be brought online. At this point, the connection between DMI 0 304-0 and PCH 308-1 may be terminated so that the only remaining link is between DMI 2 304-2 and PCH 308-0. This enables CPU 2 320-2 to now act as CPU0 or the legacy CPU for the system. CPU 0 320-0 comes online as CPU 2 of the system. At this point, the system has been de-partitioned and CPU 0 320-0 takes its place in the operational system.

In some embodiments, DMI fabric 302 may be instantiated as an FPGA to implement an N×2 PCIe switch. A PCIe switch may be provided as a generic design or IP block. The difference between a DMI switch or DMI fabric 302, as disclosed herein, and a standard PCIe switch is the programming of legacy resources as illustrated herein.

In some embodiments, new CPU boards may be implemented, with the CPU's MCRT being programmed within the CPU boards without requiring a reset. The BMC may request the system to enter quiescent mode before programming the MCRT. The register programming interface may use PECI, or in some special cases it may be programmed with the BMC JTAG interface.

Embodiments of the present specification use a single FPGA to implement most of the functions required for legacy socket hot plug, including DMI fabric logic and two PCH boot logic blocks. Note that while FPGAs are used as an illustrative example, other embodiments of a DMI fabric 302 as disclosed in FIGS. 3-4, or a DMI switch 116 as illustrated in FIG. 1, may be provided in any other type of logic, such as a programmable fabric, a programmable switch, a programmable interconnect, an ASIC, system-on-a-chip, or other embodiments. Some embodiments may also include a PCH, mini PCH, DMI fabric, DMI switch, DMI inputs, SPI inputs or outputs, and/or boot stores implemented as separate IP blocks that can be integrated modularly into silicon designs.

In some embodiments, it is either infeasible or not cost-effective to implement all features of a PCH in PCH 308. This can include, for example, features such as clock generators, USB, serial advanced technology attachment (SATA) host controllers, and other features that are not necessary to boot the CPU. However, in some embodiments it is still desirable to provide these, in which case third-party controllers or add-ins may be used.

Figure 5:
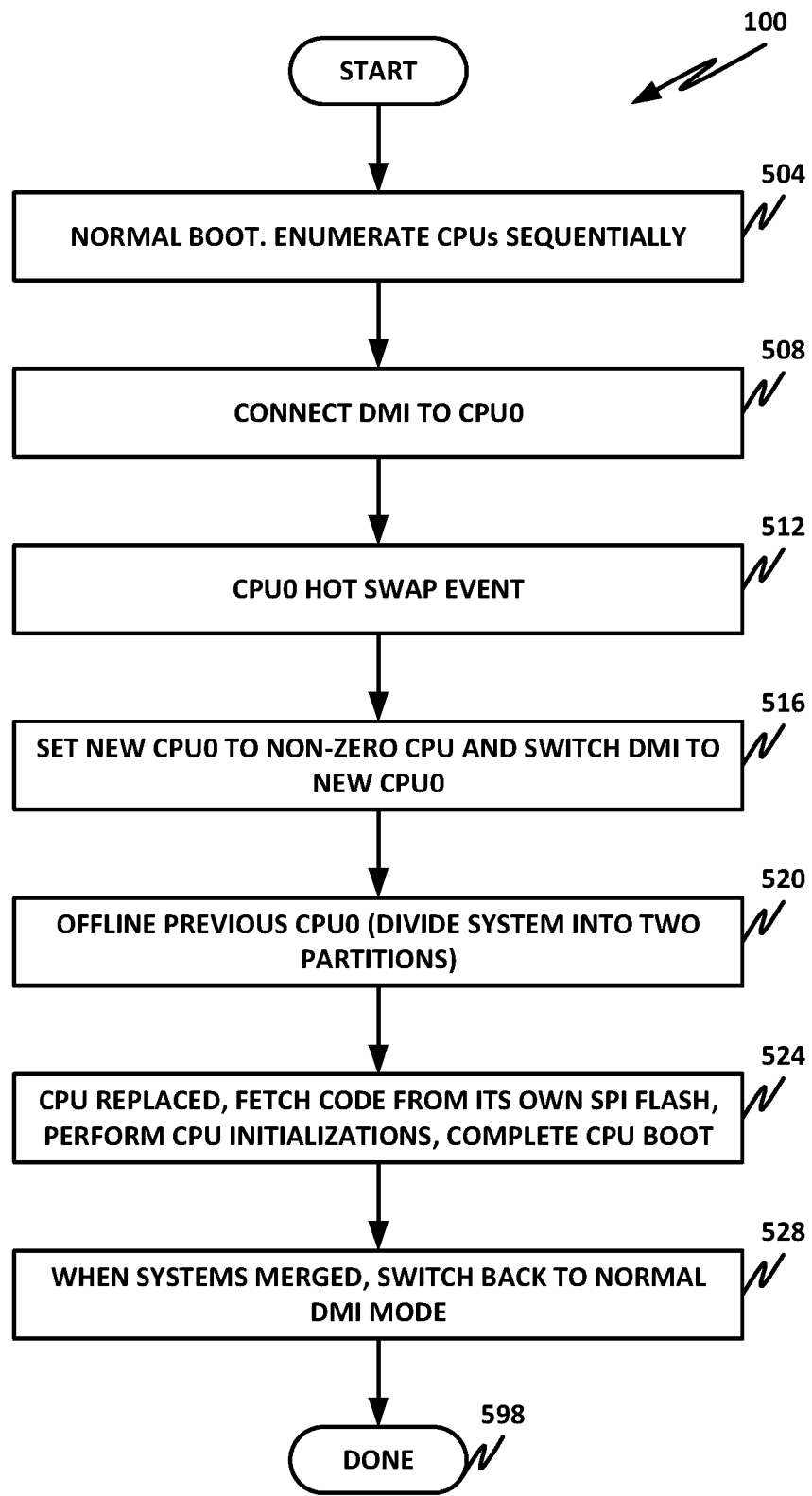
FIG. 5 is a block diagram of a method of performing CPU hot swap, according to one or more examples of the present specification.

FIG. 5 is a block diagram of a method 500 of performing CPU hot swap, according to one or more examples of the present specification.

In block 504, the system boots up normally, and CPUs are enumerated sequentially. For example, in the illustration of FIGS. 3-4, CPUs are enumerated as CPU 0, CPU 1, CPU 2, and CPU 3, respectively, according to their position within the system.

In block 508, the system connects the DMI to CPU0, which provides routing to a PCH or mini PCH, which communicatively couples via SPI to a boot store, such as a flash memory.

In block 512, the system detects a CPU0 hot swap event. This means that CPU0 is to be swapped while the system remains operational, and without requiring a reset.

In block 516, the system may re-enumerate CPUs, such as by designating the old CPU0 socket as a non-zero CPU, while designating a different CPU as CPU0. The system may then operate a DMI fabric or a DMI switch to communicatively couple the newly designated CPU0 to the primary PCH, and thereby to the primary boot store. This newly enumerated CPU0 may then assume the duties of CPU0 in the system.

In block 520, the old CPU0 is taken offline, such as by the BMC providing a signal to the chipset indicating that the CPU0 socket is to be brought offline. This divides the system into two partitions. The operational partition continues to operate with the remaining CPUs, with the newly designated CPU0 acting as a legacy socket. The old CPU0 now exists in its own separate partition where it can be trained and brought online without interfering with other system operations.

In block 524, a new CPU is placed in the CPU0 socket and is prepared to be trained. The new CPU fetches boot code from the backup boot store via the backup PCH, with the DMI fabric providing a temporary routing to the DMI port for the CPU0 socket. After retrieving the boot code, the new CPU is brought online, initialized, and trained. The new CPU now has a designation of CPUN, wherein N≠0.

In block 528, the new CPU in the old legacy socket has been brought online and trained. It is now ready to be merged with the rest of the system. To merge with the rest of the system, the DMI switch may provide new routing in the DMI fabric to terminate the now unnecessary connection between the new CPU and the backup PCH, thus returning the DMI switch to its normal operating mode. The DMI switch now has a single route between the primary PCH and the current CPU0.

Note that the new CPU0 now acts as the legacy socket for the system. Thus, the new CPU in this original CPU0 socket can be hot swapped without the need for performing this method. But if the new CPU0 is to be hot swapped, because it is acting as the legacy socket, method 500 needs to be performed to swap out the newly designated CPU0.

Figure 6:
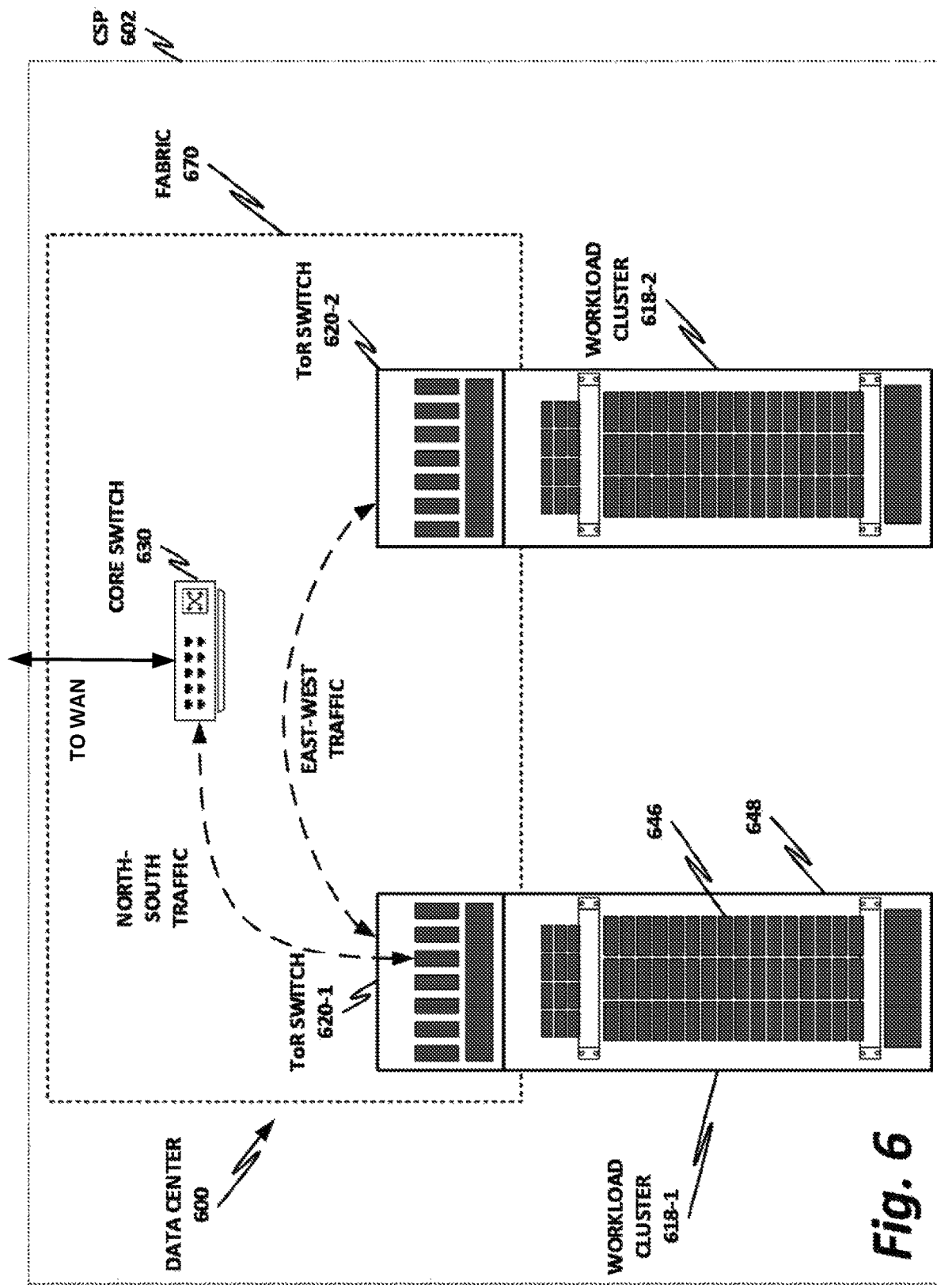
FIG. 6 is a block diagram of selected components of a data center with connectivity to a cloud service provider (CSP), according to one or more examples of the present application.

FIG. 6 is a block diagram of selected components of a data center 600 with connectivity to a CSP 602, according to one or more examples of the present specification. Embodiments of data center 600 disclosed herein may be adapted or configured to provide the method of CPU hot-swapping according to the teachings of the present specification.

CSP 602 may be, by way of nonlimiting example, a traditional enterprise data center, an enterprise "private cloud," or a "public cloud," providing services such as infrastructure as a service (IaaS), platform as a service (PaaS), or software as a service (SaaS). In some cases, CSP 602 may provide, instead of or in addition to cloud services, high performance computing (HPC) platforms or services. Indeed, while not expressly identical, HPC clusters ("supercomputers") may be structurally similar to cloud data centers, and unless and except where expressly specified, the teachings of this specification may be applied to either.

CSP 602 may provision some number of workload clusters 618, which may be clusters of individual servers, blade servers, rackmount servers, or any other suitable server topology. In this illustrative example, two workload clusters, 618-1 and 618-2 are shown, each providing rackmount servers 646 in a chassis 648.

In this illustration, workload clusters 618 are shown as modular workload clusters conforming to the rack unit ("U") standard, in which a standard rack, 19 inches wide, may be built to accommodate 42 units (42U), each 1.75 inches high and approximately 36 inches deep. In this case, compute resources such as processors, memory, storage, accelerators, and switches may fit into some multiple of rack units from one to 42. A rackmount server is illustrated as an alternative embodiment to the blade servers discussed in previous embodiments. The teachings relative to a blade server as illustrated in FIGS. 1-5 are expressly applicable to a rackmount server as illustrated in FIG. 6.

Each server 646 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 646 may be specifically dedicated to certain enterprise clients or tenants, while others may be shared.

The various devices in a data center may be connected to each other via a switching fabric 670, which may include one or more high speed routing and/or switching devices. Switching fabric 670 may provide both "north-south" traffic (e.g., traffic to and from the wide area network (WAN), such as the Internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 646 increases, traffic volume may further increase. For example, each server 646 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 670 may be provided. Switching fabric 670 is illustrated in this example as a "flat" network, wherein each server 646 may have a direct connection to a top-of-rack (ToR) switch 620 (e.g., a "star" configuration), and each ToR switch 620 may couple to a core switch 630. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 646 may include an Intel® Host Fabric Interface (HFI), a network interface card (NIC), a host channel adapter (HCA), or other host interface. For simplicity and unity, these may be referred to throughout this specification as a "host fabric interface" (HFI), which should be broadly construed as an interface to communicatively couple the host to the data center fabric. The HFI may couple to one or more host processors via an interconnect or bus, such as PCI, PCIe, or similar. In some cases, this interconnect bus, along with other "local" interconnects (e.g., core-to-core Ultra Path Interconnect) may be considered to be part of fabric 670. In other embodiments, the Ultra Path Interconnect (UPI) (or other local coherent interconnect) may be treated as part of the secure domain of the processor complex, and thus not part of the fabric.

The interconnect technology may be provided by a single interconnect or a hybrid interconnect, such as where PCIe provides on-chip communication, 1 Gb or 10 Gb copper Ethernet provides relatively short connections to a ToR switch 620, and optical cabling provides relatively longer connections to core switch 630. Interconnect technologies that may be found in the data center include, by way of nonlimiting example, Intel® Omni-Path™ Architecture (OPA), TrueScale™, UPI (formerly called QPI or KTI), FibreChannel, Ethernet, FibreChannel over Ethernet (FCoE), InfiniBand, PCI, PCIe, or fiber optics, to name just a few. The fabric may be cache- and memory-coherent, cache- and memory-non-coherent, or a hybrid of coherent and non-coherent interconnects. Some interconnects are more popular for certain purposes or functions than others, and selecting an appropriate fabric for the instant application is an exercise of ordinary skill. For example, OPA and Infiniband are commonly used in HPC applications, while Ethernet and FibreChannel are more popular in cloud data centers. But these examples are expressly nonlimiting, and as data centers evolve fabric technologies similarly evolve.

Note that while high-end fabrics such as OPA are provided herein by way of illustration, more generally, fabric 670 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies may arise to supplement or replace some of those listed here, and any such future network topologies and technologies can be or form a part of fabric 670.

In certain embodiments, fabric 670 may provide communication services on various "layers," as originally outlined in the Open Systems Interconnection (OSI) seven-layer network model. In contemporary practice, the OSI model is not followed strictly. In general terms, layers 1 and 2 are often called the "Ethernet" layer (though in some data centers or supercomputers, Ethernet may be supplanted or supplemented by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 7:
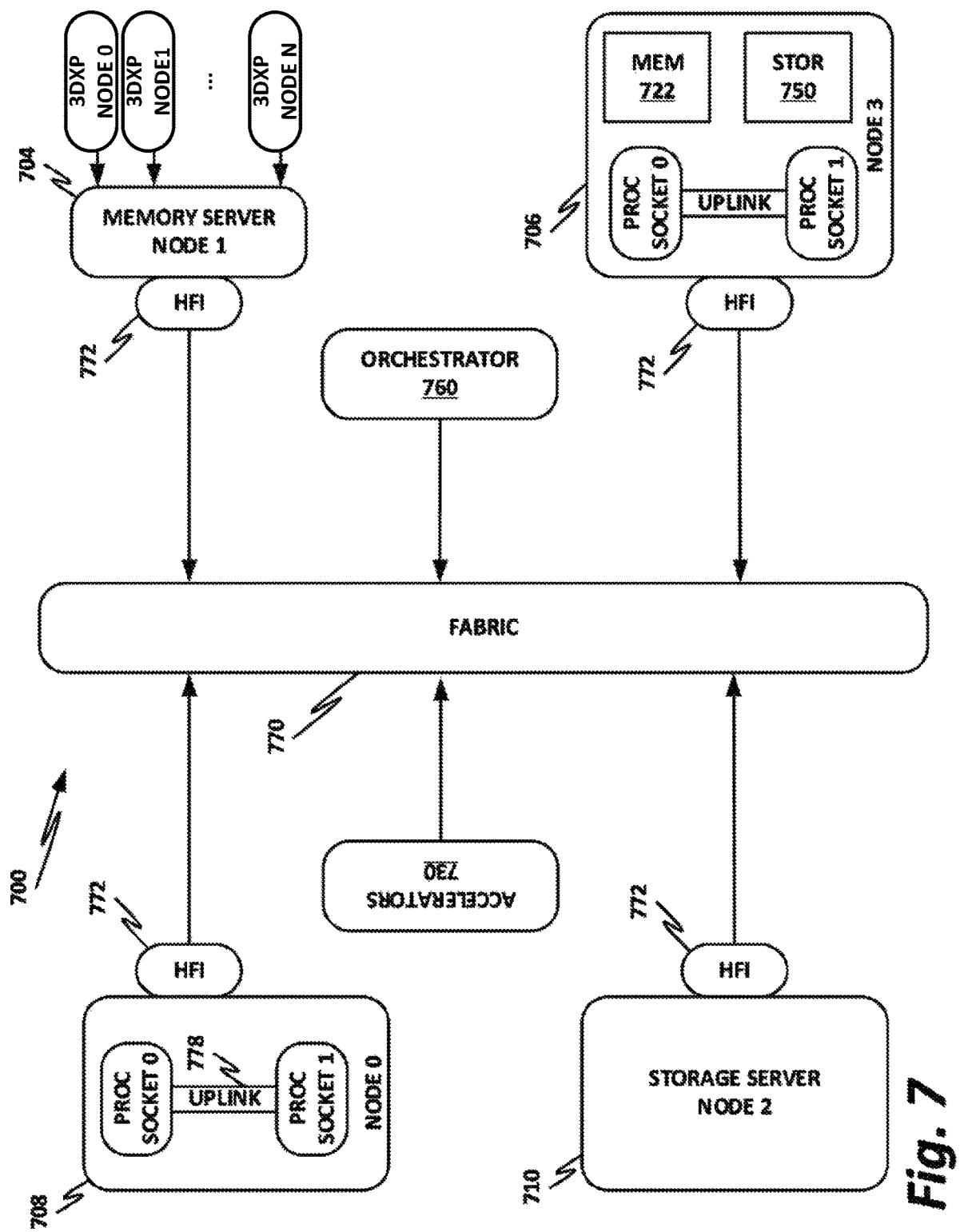
FIG. 7 is a block diagram of selected components of an end user computing device, according to one or more examples of the present specification.

FIG. 7 is a block diagram of an end user computing device 700, according to one or more examples of the present specification. Embodiments of computing device 700 disclosed herein may be adapted or configured to provide the method of CPU hot-swapping according to the teachings of the present specification. As above, computing device 700 may provide, as appropriate, cloud service, HPC, telecommunication services, enterprise data center services, or any other compute services that benefit from a computing device 700.

In this example, a fabric 770 is provided to interconnect various aspects of computing device 700. Fabric 770 may be the same as fabric 670 of FIG. 6, or may be a different fabric. As above, fabric 770 may be provided by any suitable interconnect technology. In this example, Intel® Omni-Path™ is used as an illustrative and nonlimiting example.

As illustrated, computing device 700 includes a number of logic elements forming a plurality of nodes. It should be understood that each node may be provided by a physical server, a group of servers, or other hardware. Each server may be running one or more virtual machines as appropriate to its application.

Node 0 708 is a processing node including a processor socket 0 and processor socket 1. The processors may be, for example, Intel® Xeon™ processors with a plurality of cores, such as 4 or 8 cores. Node 0 708 may be configured to provide network or workload functions, such as by hosting a plurality of virtual machines or virtual appliances.

Onboard communication between processor socket 0 and processor socket 1 may be provided by an onboard uplink 778. This may provide a very high speed, short-length interconnect between the two processor sockets, so that virtual machines running on node 0 708 can communicate with one another at very high speeds. To facilitate this communication, a virtual switch (vSwitch) may be provisioned on node 0 708, which may be considered to be part of fabric 770.

Node 0 708 connects to fabric 770 via an HFI 772. HFI 772 may connect to an Intel® Omni-Path™ fabric. In some examples, communication with fabric 770 may be tunneled, such as by providing UPI tunneling over Omni-Path™.

Because computing device 700 may provide many functions in a distributed fashion that in previous generations were provided onboard, a highly capable HFI 772 may be provided. HFI 772 may operate at speeds of multiple gigabits per second, and in some cases may be tightly coupled with node 0 708. For example, in some embodiments, the logic for HFI 772 is integrated directly with the processors on a system-on-a-chip. This provides very high speed communication between HFI 772 and the processor sockets, without the need for intermediary bus devices, which may introduce additional latency into the fabric. However, this is not to imply that embodiments where HFI 772 is provided over a traditional bus are to be excluded. Rather, it is expressly anticipated that in some examples, HFI 772 may be provided on a bus, such as a PCIe bus, which is a serialized version of PCI that provides higher speeds than traditional PCI. Throughout computing device 700, various nodes may provide different types of HFIs 772, such as onboard HFIs and plug-in HFIs. It should also be noted that certain blocks in a system-on-a-chip may be provided as IP blocks that can be "dropped" into an integrated circuit as a modular unit. Thus, HFI 772 may in some cases be derived from such an IP block.

Note that in "the network is the device" fashion, node 0 708 may provide limited or no onboard memory or storage. Rather, node 0 708 may rely primarily on distributed services, such as a memory server and a networked storage server. Onboard, node 0 708 may provide only sufficient memory and storage to bootstrap the device and get it communicating with fabric 770. This kind of distributed architecture is possible because of the very high speeds of contemporary data centers, and may be advantageous because there is no need to over-provision resources for each node. Rather, a large pool of high speed or specialized memory may be dynamically provisioned between a number of nodes, so that each node has access to a large pool of resources, but those resources do not sit idle when that particular node does not need them.

In this example, a node 1 memory server 704 and a node 2 storage server 710 provide the operational memory and storage capabilities of node 0 708. For example, memory server node 1 704 may provide remote direct memory access (RDMA), whereby node 0 708 may access memory resources on node 1 704 via fabric 770 in a direct memory access fashion, similar to how it would access its own onboard memory. The memory provided by memory server 704 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 708, a storage server node 2 710 may be provided. Storage server 710 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 708 may access memory from memory server 704 and store results on storage provided by storage server 710. Each of these devices couples to fabric 770 via a HFI 772, which provides fast communication that makes these technologies possible.

By way of further illustration, node 3 706 is also depicted. Node 3 706 also includes a HFI 772, along with two processor sockets internally connected by an uplink. However, unlike node 0 708, node 3 706 includes its own onboard memory 722 and storage 750. Thus, node 3 706 may be configured to perform its functions primarily onboard, and may not be required to rely upon memory server 704 and storage server 710. However, in appropriate circumstances, node 3 706 may supplement its own onboard memory 722 and storage 750 with distributed resources similar to node 0 708.

Computing device 700 may also include accelerators 730. These may provide various accelerated functions, including hardware or coprocessor acceleration for functions such as packet processing, encryption, decryption, compression, decompression, network security, or other accelerated functions in the data center. In some examples, accelerators 730 may include deep learning accelerators that may be directly attached to one or more cores in nodes such as node 0 708 or node 3 706. Examples of such accelerators can include, by way of nonlimiting example, Intel® QuickData Technology (QDT), Intel® QuickAssist Technology (QAT), Intel®

Direct Cache Access (DCA), Intel® Extended Message Signaled Interrupt (MSI-X), Intel® Receive Side Coalescing (RSC), and other acceleration technologies.

In other embodiments, an accelerator could also be provided as an ASIC, FPGA, coprocessor, graphics processing unit (GPU), digital signal processor (DSP), or other processing entity, which may optionally be tuned or configured to provide the accelerator function.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), PFM (e.g., Intel® 3D Crosspoint™), external storage, RAID, RAIN, NAS, optical storage, tape drive, backup system, cloud storage, or any combination of the foregoing by way of nonlimiting example. Such a medium could also include instructions programmed into an FPGA, or encoded in hardware on an ASIC or processor.

FIG. 8 is a block diagram of components of a computing platform 802A, according to one or more examples of the present specification. Embodiments of computing platform 802A disclosed herein may be adapted or configured to provide the method of CPU hot-swapping according to the teachings of the present specification.

In the embodiment depicted, platforms 802A, 802B, and 802C, along with a data center management platform 806 and data analytics engine 804 are interconnected via network 808. In other embodiments, a computer system may include any suitable number of (i.e., one or more) platforms. In some embodiments (e.g., when a computer system only includes a single platform), all or a portion of the system management platform 806 may be included on a platform 802. A platform 802 may include platform logic 810 with one or more central processing units (CPUs) 812, memories 814 (which may include any number of different modules), chipsets 816, communication interfaces 818, and any other suitable hardware and/or software to execute a hypervisor 820 or other operating system capable of executing workloads associated with applications running on platform 802. In some embodiments, a platform 802 may function as a host platform for one or more guest systems 822 that invoke these applications. Platform 802A may represent any suitable computing environment, such as a HPC environment, a data center, a communications service provider infrastructure (e.g., one or more portions of an Evolved Packet Core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 806, hypervisor 820, or other operating system) of computer platform 802A may assign hardware resources of platform logic 810 to perform workloads in accordance with the stress information. In some embodiments, self-diagnostic capabilities may be combined with the stress monitoring to more accurately determine the health of the hardware resources. Each platform 802 may include platform logic 810. Platform logic 810 comprises, among other logic enabling the functionality of platform 802, one or more CPUs 812, memory 814, one or more chipsets 816, and communication interfaces 828. Although three platforms are illustrated, computer platform 802A may be interconnected with any suitable number of platforms. In various embodiments, a platform 802 may reside on a circuit board that is installed in a chassis, rack, or other suitable structure that comprises multiple platforms coupled together through network 808 (which may comprise, e.g., a rack or backplane switch).

CPUs 812 may each comprise any suitable number of processor cores and supporting logic (e.g., uncores). The cores may be coupled to each other, to memory 814, to at least one chipset 816, and/or to a communication interface 818, through one or more controllers residing on CPU 812 and/or chipset 816. In particular embodiments, a CPU 812 is embodied within a socket that is permanently or removably coupled to platform 802A. Although four CPUs are shown, a platform 802 may include any suitable number of CPUs.

Memory 814 may comprise any form of volatile or nonvolatile memory including, without limitation, magnetic media (e.g., one or more tape drives), optical media, random access memory (RAM), ROM, flash memory, removable media, or any other suitable local or remote memory component or components. Memory 814 may be used for short, medium, and/or long term storage by platform 802A. Memory 814 may store any suitable data or information utilized by platform logic 810, including software embedded in a computer-readable medium, and/or encoded logic incorporated in hardware or otherwise stored (e.g., firmware). Memory 814 may store data that is used by cores of CPUs 812. In some embodiments, memory 814 may also comprise storage for instructions that may be executed by the cores of CPUs 812 or other processing elements (e.g., logic resident on chipsets 816) to provide functionality associated with the manageability engine 826 or other components of platform logic 810. A platform 802 may also include one or more chipsets 816 comprising any suitable logic to support the operation of the CPUs 812. In various embodiments, chipset 816 may reside on the same die or package as a CPU 812 or on one or more different dies or packages. Each chipset may support any suitable number of CPUs 812. A chipset 816 may also include one or more controllers to couple other components of platform logic 810 (e.g., communication interface 818 or memory 814) to one or more CPUs. In the embodiment depicted, each chipset 816 also includes a manageability engine 826. Manageability engine 826 may include any suitable logic to support the operation of chipset 816. In a particular embodiment, a manageability engine 826 (which may also be referred to as an innovation engine) is capable of collecting real-time telemetry data from the chipset 816, the CPU(s) 812 and/or memory 814 managed by the chipset 816, other components of platform logic 810, and/or various connections between components of platform logic 810. In various embodiments, the telemetry data collected includes the stress information described herein.

In various embodiments, a manageability engine 826 operates as an out-of-band asynchronous compute agent which is capable of interfacing with the various elements of platform logic 810 to collect telemetry data with no or minimal disruption to running processes on CPUs 812. For example, manageability engine 826 may comprise a dedicated processing element (e.g., a processor, controller, or other logic) on chipset 816, which provides the functionality of manageability engine 826 (e.g., by executing software instructions), thus conserving processing cycles of CPUs 812 for operations associated with the workloads performed by the platform logic 810. Moreover the dedicated logic for the manageability engine 826 may operate asynchronously with respect to the CPUs 812 and may gather at least some of the telemetry data without increasing the load on the CPUs.

A manageability engine 826 may process telemetry data it collects (specific examples of the processing of stress information are provided herein). In various embodiments, manageability engine 826 reports the data it collects and/or the results of its processing to other elements in the computer system, such as one or more hypervisors 820 or other operating systems and/or system management software (which may run on any suitable logic such as system management platform 806). In particular embodiments, a critical event such as a core that has accumulated an excessive amount of stress may be reported prior to the normal interval for reporting telemetry data (e.g., a notification may be sent immediately upon detection).

Additionally, manageability engine 826 may include programmable code configurable to set which CPU(s) 812 a particular chipset 816 manages and/or which telemetry data may be collected.

Chipsets 816 also each include a communication interface 828. Communication interface 828 may be used for the communication of signaling and/or data between chipset 816 and one or more I/O devices, one or more networks 808, and/or one or more devices coupled to network 808 (e.g., system management platform 806). For example, communication interface 828 may be used to send and receive network traffic such as data packets. In a particular embodiment, a communication interface 828 comprises one or more physical network interface controllers (NICs), also known as network interface cards or network adapters. A NIC may include electronic circuitry to communicate using any suitable physical layer and data link layer standard such as Ethernet (e.g., as defined by an IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 816 (e.g., manageability engine 826 or switch 830) and another device coupled to network 808. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 828 may allow communication of data (e.g., between the manageability engine 826 and the data center management platform 806) associated with management and monitoring functions performed by manageability engine 826. In various embodiments, manageability engine 826 may utilize elements (e.g., one or more NICs) of communication interfaces 828 to report the telemetry data (e.g., to system management platform 806) in order to reserve usage of NICs of communication interface 818 for operations associated with workloads performed by platform logic 810.

Switches 830 may couple to various ports (e.g., provided by NICs) of communication interface 828 and may switch data between these ports and various components of chipset 816 (e.g., one or more Peripheral Component Interconnect Express (PCIe) lanes coupled to CPUs 812). Switches 830 may be a physical or virtual (i.e., software) switch.

Platform logic 810 may include an additional communication interface 818. Similar to communication interfaces 828, communication interfaces 818 may be used for the communication of signaling and/or data between platform logic 810 and one or more networks 808 and one or more devices coupled to the network 808. For example, communication interface 818 may be used to send and receive network traffic such as data packets. In a particular embodiment, communication interfaces 818 comprise one or more physical NICs. These NICs may enable communication between any suitable element of platform logic 810 (e.g., CPUs 812 or memory 814) and another device coupled to network 808 (e.g., elements of other platforms or remote computing devices coupled to network 808 through one or more networks).

Platform logic 810 may receive and perform any suitable types of workloads. A workload may include any request to utilize one or more resources of platform logic 810, such as one or more cores or associated logic. For example, a workload may comprise a request to instantiate a software component, such as an I/O device driver 824 or guest system 822; a request to process a network packet received from a virtual machine 832 or device external to platform 802A (such as a network node coupled to network 808); a request to execute a process or thread associated with a guest system 822, an application running on platform 802A, a hypervisor 820 or other operating system running on platform 802A; or other suitable processing request.

A virtual machine 832 may emulate a computer system with its own dedicated hardware. A virtual machine 832 may run a guest operating system on top of the hypervisor 820. The components of platform logic 810 (e.g., CPUs 812, memory 814, chipset 816, and communication interface 818) may be virtualized such that it appears to the guest operating system that the virtual machine 832 has its own dedicated components.

A virtual machine 832 may include a virtualized NIC (vNIC), which is used by the virtual machine as its network interface. A vNIC may be assigned a media access control (MAC) address or other identifier, thus allowing multiple virtual machines 832 to be individually addressable in a network.

VNF 834 may comprise a software implementation of a functional building block with defined interfaces and behavior that can be deployed in a virtualized infrastructure. In particular embodiments, a VNF 834 may include one or more virtual machines 832 that collectively provide specific functionalities (e.g., WAN optimization, virtual private network (VPN) termination, firewall operations, load-balancing operations, security functions, etc.). A VNF 834 running on platform logic 810 may provide the same functionality as traditional network components implemented through dedicated hardware. For example, a VNF 834 may include components to perform any suitable NFV workloads, such as virtualized evolved packet core (vEPC) components, mobility management entities, 3rd Generation Partnership Project (3GPP) control and data plane components, etc.

SFC 836 is a group of VNFs 834 organized as a chain to perform a series of operations, such as network packet processing operations. Service function chaining may provide the ability to define an ordered list of network services (e.g. firewalls, load balancers) that are stitched together in the network to create a service chain.

A hypervisor 820 (also known as a virtual machine monitor) may comprise logic to create and run guest systems 822. The hypervisor 820 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 810. Services of hypervisor 820 may be provided by virtualizing in software or through hardware assisted resources that require minimal software intervention, or both. Multiple instances of a variety of guest operating systems may be managed by the hypervisor 820. Each platform 802 may have a separate instantiation of a hypervisor 820.

Hypervisor 820 may be a native or bare-metal hypervisor that runs directly on platform logic 810 to control the platform logic and manage the guest operating systems. Alternatively, hypervisor 820 may be a hosted hypervisor that runs on a host operating system and abstracts the guest operating systems from the host operating system. Hypervisor 820 may include a virtual switch 838 that may provide virtual switching and/or routing functions to virtual machines of guest systems 822. The virtual switch 838 may comprise a logical switching fabric that couples the vNICs of the virtual machines 832 to each other, thus creating a virtual network through which virtual machines may communicate with each other.

Virtual switch 838 may comprise a software element that is executed using components of platform logic 810. In various embodiments, hypervisor 820 may be in communication with any suitable entity (e.g., a SDN controller) which may cause hypervisor 820 to reconfigure the parameters of virtual switch 838 in response to changing conditions in platform 802 (e.g., the addition or deletion of virtual machines 832 or identification of optimizations that may be made to enhance performance of the platform).

Hypervisor 820 may also include resource allocation logic 844, which may include logic for determining allocation of platform resources based on the telemetry data (which may include stress information). Resource allocation logic 844 may also include logic for communicating with various components of platform logic 810 entities of platform 802A to implement such optimization, such as components of platform logic 810.

Any suitable logic may make one or more of these optimization decisions. For example, system management platform 806; resource allocation logic 844 of hypervisor 820 or other operating system; or other logic of computer platform 802A may be capable of making such decisions. In various embodiments, the system management platform 806 may receive telemetry data from and manage workload placement across multiple platforms 802. The system management platform 806 may communicate with hypervisors 820 (e.g., in an out-of-band manner) or other operating systems of the various platforms 802 to implement workload placements directed by the system management platform.

The elements of platform logic 810 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the computer platform 802A may be coupled together in any suitable manner such as through one or more networks 808. A network 808 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Generic Vector-Friendly Instruction Format

A vector-friendly instruction format is an instruction format that is suited for vector instructions (e.g., there are certain fields specific to vector operations). While embodiments are described in which both vector and scalar operations are supported through the vector-friendly instruction format, alternative embodiments use only vector operations through the vector-friendly instruction format.

FIGS. 9a-9b are block diagrams illustrating a generic vector-friendly instruction format and instruction templates thereof, according to embodiments of the specification. Embodiments of vector-friendly instruction formats and templates disclosed herein may be adapted or configured to provide the method of CPU hot-swapping according to the teachings of the present specification.

FIG. 9a is a block diagram illustrating a generic vector-friendly instruction format and class A instruction templates thereof according to embodiments of the specification; while FIG. 9b is a block diagram illustrating the generic vector-friendly instruction format and class B instruction templates thereof according to embodiments of the specification. Specifically, a generic vector-friendly instruction format 900 for which are defined class A and class B instruction templates, both of which include no memory access 905 instruction templates and memory access 920 instruction templates. The term generic in the context of the vector-friendly instruction format refers to the instruction format not being tied to any specific instruction set.

Embodiments of the specification will be described in which the vector-friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 9a include: 1) within the no memory access 905 instruction templates there is shown a no memory access, full round control type operation 910 instruction template and a no memory access, data transform type operation 915 instruction template; and 2) within the memory access 920 instruction templates there is shown a memory access, temporal 925 instruction template and a memory access, nontemporal 930 instruction template. The class B instruction templates in FIG. 9b include: 1) within the no memory access 905 instruction templates there is shown a no memory access, write mask control, partial round control type operation 912 instruction template and a no memory access, write mask control, VSIZE type operation 917 instruction template; and 2)

within the memory access 920 instruction templates there is shown a memory access, write mask control 927 instruction template.

The generic vector-friendly instruction format 900 includes the following fields listed below in the order illustrated in FIGS. 9a-9b.

Format field 940—a specific value (an instruction format identifier value) in this field uniquely identifies the vector-friendly instruction format, and thus occurrences of instructions in the vector-friendly instruction format in instruction streams. As such, this field is optional in the sense that it is not needed for an instruction set that has only the generic vector-friendly instruction format.

Base operation field 942—its content distinguishes different base operations.

Register index field 944—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or fewer sources and destination registers (e.g., may support up to two sources where one of these sources also acts as the destination, may support up to three sources where one of these sources also acts as the destination, or may support up to two sources and one destination).

Modifier field 946—its content distinguishes occurrences of instructions in the generic vector instruction format that specify memory access from those that do not; that is, between no memory access 905 instruction templates and memory access 920 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, fewer, or different ways to perform memory address calculations.

Augmentation operation field 950—its content distinguishes which one of a variety of different operations to be performed in addition to the base operation. This field is context specific. In one embodiment of the specification, this field is divided into a class field 968, an alpha field 952, and a beta field 954. The augmentation operation field 950 allows common groups of operations to be performed in a single instruction rather than 2, 3, or 4 instructions.

Scale field 960—its content allows for the scaling of the index field's content for memory address generation (e.g., for address generation that uses 2scale*index+base).

Displacement Field 962A—its content is used as part of memory address generation (e.g., for address generation that uses 2scale*index+base+displacement).

Displacement Factor Field 9628 (note that the juxtaposition of displacement field 962A directly over displacement factor field 9628 indicates one or the other is used)—its content is used as part of address generation; it specifies a displacement factor that is to be scaled by the size of a memory access (N)—where N is the number of bytes in the memory access (e.g., for address generation that uses 2scale*index+base+scaled displacement). Redundant low-order bits are ignored and hence, the displacement factor field's content is multiplied by the memory operand's total size (N) in order to generate the final displacement to be used in calculating an effective address. The value of N is determined by the processor hardware at runtime based on the full opcode field 974 (described later herein) and the data manipulation field 954C. The displacement field 962A and the displacement factor field 9628 are optional in the sense that they are not used for the no memory access 905 instruction templates and/or different embodiments may implement only one or none of the two.

Data element width field 964—its content distinguishes which one of a number of data element widths is to be used (in some embodiments, for all instructions; in other embodiments, for only some of the instructions). This field is optional in the sense that it is not needed if only one data element width is supported and/or data element widths are supported using some aspect of the opcodes.

Write mask field 970—its content controls, on a per data element position basis, whether that data element position in the destination vector operand reflects the result of the base operation and augmentation operation. Class A instruction templates support merging-write masking, while class B instruction templates support both merging and zeroing-write masking. When merging, vector masks allow any set of elements in the destination to be protected from updates during the execution of any operation (specified by the base operation and the augmentation operation)—in one embodiment, preserving the old value of each element of the destination where the corresponding mask bit has a 0. In contrast, when zeroing vector masks allow any set of elements in the destination to be zeroed during the execution of any operation (specified by the base operation and the augmentation operation), in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 970 allows for partial vector operations, including loads, stores, arithmetic, logical, etc. While embodiments of the specification are described in which the write mask field's 970 content selects one of a number of write mask registers that contains the write mask to be used (and thus the write mask field's 970 content indirectly identifies that masking to be performed), alternative embodiments instead or additionally allow the mask write field's 970 content to directly specify the masking to be performed.

Immediate field 972—its content allows for the specification of an immediate. This field is optional in the sense that is it not present in an implementation of the generic vector-friendly format that does not support immediate and it is not present in instructions that do not use an immediate.

Class field 968—its content distinguishes between different classes of instructions. With reference to FIGS. 9a-9b, the contents of this field select between class A and class B instructions. In FIGS. 9a-9b, rounded corner squares are used to indicate a specific value is present in a field (e.g., class A 968A and class B 968B for the class field 968 respectively in FIGS. 9a-9b).

Instruction Templates of Class A

In the case of the non-memory access 905 instruction templates of class A, the alpha field 952 is interpreted as an RS field 952A, whose content distinguishes which one of the different augmentation operation types are to be performed (e.g., round 952A.1 and data transform 952A.2 are respectively specified for the no memory access, round type operation 910 and the no memory access, data transform type operation 915 instruction templates), while the beta field 954 distinguishes which of the operations of the specified type is to be performed. In the no memory access 905 instruction templates, the scale field 960, the displacement field 962A, and the displacement scale filed 962B are not present.

No Memory Access Instruction Templates—Full Round Control Type Operation

In the no memory access full round control type operation 910 instruction template, the beta field 954 is interpreted as a round control field 954A, whose content provides static rounding. While in the described embodiments of the specification the round control field 954A includes a suppress all floating point exceptions (SAE) field 956 and a round operation control field 958, alternative embodiments may encode both these concepts into the same field or only have one or the other of these concepts/fields (e.g., may have only the round operation control field 958).

SAE field 956—its content distinguishes whether or not to disable the exception event reporting; when the SAE field's 956 content indicates suppression is enabled, a given instruction does not report any kind of floating point exception flag and does not raise any floating point exception handler.

Round operation control field 958—its content distinguishes which one of a group of rounding operations to perform (e.g., round-up, round-down, round-towards-zero and round-to-nearest). Thus, the round operation control field 958 allows for the changing of the rounding mode on a per instruction basis. In one embodiment of the specification where a processor includes a control register for specifying rounding modes, the round operation control field's 950 content overrides that register value.

No Memory Access Instruction Templates—Data Transform Type Operation

In the no memory access data transform type operation 915 instruction template, the beta field 954 is interpreted as a data transform field 9546, whose content distinguishes which one of a number of data transforms is to be performed (e.g., no data transform, swizzle, broadcast).

In the case of a memory access 920 instruction template of class A, the alpha field 952 is interpreted as an eviction hint field 9526, whose content distinguishes which one of the eviction hints is to be used (in FIG. 9a, temporal 9526.1 and nontemporal 9526.2 are respectively specified for the memory access, temporal 925 instruction template and the memory access, nontemporal 930 instruction template), while the beta field 954 is interpreted as a data manipulation field 954C, whose content distinguishes which one of a number of data manipulation operations (also known as primitives) is to be performed (e.g., no manipulation; broadcast; up conversion of a source; and down conversion of a destination). The memory access 920 instruction templates include the scale field 960, and optionally the displacement field 962A or the displacement scale field 962B.

Vector memory instructions perform vector loads from and vector stores to memory, with conversion support. As with regular vector instructions, vector memory instructions transfer data from/to memory in a data element-wise fashion, with the elements that are actually transferred as dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Nontemporal

Nontemporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 952 is interpreted as a write mask control (Z) field 952C, whose content distinguishes whether the write masking controlled by the write mask field 970 should be a merging or a zeroing.

In the case of the non-memory access 905 instruction templates of class B, part of the beta field 954 is interpreted as an RL field 957A, whose content distinguishes which one of the different augmentation operation types are to be performed (e.g., round 957A.1 and vector length (VSIZE) 957A.2 are respectively specified for the no memory access, write mask control, partial round control type operation 912 instruction template and the no memory access, write mask control, VSIZE type operation 917 instruction template), while the rest of the beta field 954 distinguishes which of the operations of the specified type is to be performed. In the no memory access 905 instruction templates, the scale field 960, the displacement field 962A, and the displacement scale field 962B are not present.

In the no memory access, write mask control, partial round control type operation 910 instruction template, the rest of the beta field 954 is interpreted as a round operation field 959A and exception event reporting is disabled (a given instruction does not report any kind of floating point exception flag and does not raise any floating point exception handler).

Round operation control field 959A—just as round operation control field 958, its content distinguishes which one of a group of rounding operations to perform (e.g., round-up, round-down, round-towards-zero and round-to-nearest). Thus, the round operation control field 959A allows for the changing of the rounding mode on a per instruction basis. In one embodiment of the specification where a processor includes a control register for specifying rounding modes, the round operation control field's 950 content overrides that register value.

In the no memory access, write mask control, VSIZE type operation 917 instruction template, the rest of the beta field 954 is interpreted as a vector length field 959B, whose content distinguishes which one of a number of data vector lengths is to be performed on (e.g., 128, 256, or 512 byte).

In the case of a memory access 920 instruction template of class B, part of the beta field 954 is interpreted as a broadcast field 957B, whose content distinguishes whether or not the broadcast type data manipulation operation is to be performed, while the rest of the beta field 954 is interpreted by the vector length field 959B. The memory access 920 instruction templates include the scale field 960, and optionally the displacement field 962A or the displacement scale field 962B.

With regard to the generic vector-friendly instruction format 900, a full opcode field 974 is shown including the format field 940, the base operation field 942, and the data element width field 964. While one embodiment is shown where the full opcode field 974 includes all of these fields, the full opcode field 974 includes less than all of these fields in embodiments that do not support all of them. The full opcode field 974 provides the operation code (opcode).

The augmentation operation field 950, the data element width field 964, and the write mask field 970 allow these features to be specified on a per instruction basis in the generic vector-friendly instruction format.

The combination of write mask field and data element width field create typed instructions in that they allow the mask to be applied based on different data element widths.

The various instruction templates found within class A and class B are beneficial in different situations. In some embodiments of the specification, different processors or different cores within a processor may support only class A, only class B, or both classes. For instance, a high performance general purpose out-of-order core intended for general purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the specification). Also, a single processor may include multiple cores, all of which support the same class or in which different cores support different classes. For instance, in a processor with separate graphics and general purpose cores, one of the graphics cores intended primarily for graphics and/or scientific computing may support only class A, while one or more of the general purpose cores may be high performance general purpose cores with out-of-order execution and register renaming intended for general purpose computing that supports only class B. Another processor that does not have a separate graphics core may include one more general purpose in-order or out-of-order cores that support both class A and class B. Of course, features from one class may also be implemented in the other class in different embodiments of the specification. Programs written in a high level language would be put (e.g., just in time compiled or statically compiled) into an variety of different executable forms, including: 1) a form having only instructions of the class or classes supported by the target processor for execution; or 2) a form having alternative routines written using different combinations of the instructions of all classes and having control flow code that selects the routines to execute based on the instructions supported by the processor which is currently executing the code.

Example Specific Vector-Friendly Instruction Format

FIGS. 10*a*-10*d* are block diagrams illustrating an example specific vector-friendly instruction format, according to one or more examples of the present specification. Embodiments of vector-friendly instruction formats disclosed herein may be adapted or configured to provide the method of CPU hot-swapping according to the teachings of the present specification.

Figure 10A:
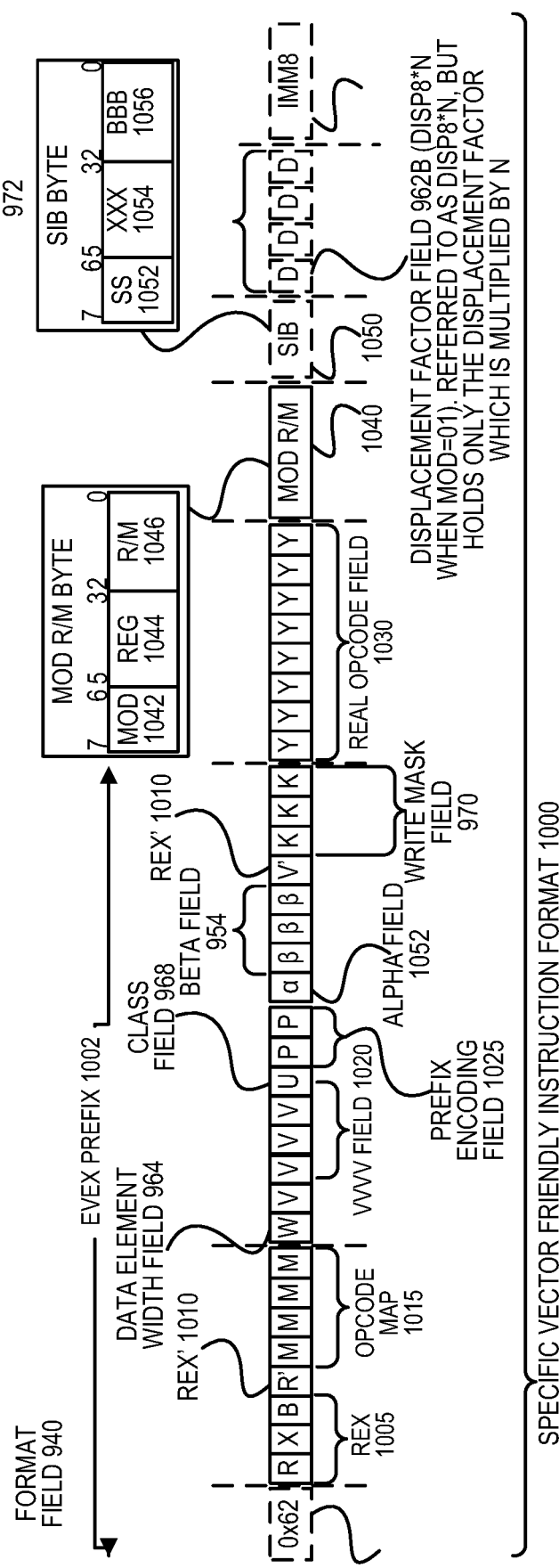
FIGS. 10a-10d are block diagrams illustrating an example specific vector-friendly instruction format, according to one or more examples of the present specification.

FIG. 10*a* shows a specific vector-friendly instruction format 1000 that is specific in the sense that it specifies the location, size, interpretation, and order of the fields, as well as values for some of those fields. The specific vector-friendly instruction format 1000 may be used to extend the x86 instruction set, and thus some of the fields are similar or the same as those used in the existing x86 instruction set and extension thereof (e.g., AVX). This format remains consistent with the prefix encoding field, real opcode byte field, MOD RIM field, Scale, Index, Base (SIB) field, displacement field, and immediate fields of the existing x86 instruction set with extensions. The fields from FIGS. 9*a*-9*b* into which the fields from FIG. 10*a* map are illustrated.

It should be understood that, although embodiments of the specification are described with reference to the specific vector-friendly instruction format 1000 in the context of the generic vector-friendly instruction format 900 for illustrative purposes, the present specification is not limited to the specific vector-friendly instruction format 1000 except where claimed. For example, the generic vector-friendly instruction format 900 contemplates a variety of possible sizes for the various fields, while the specific vector-friendly instruction format 1000 is shown as having fields of specific sizes. By way of particular example, while the data element width field 964 is illustrated as a one bit field in the specific vector-friendly instruction format 1000, the present specification is not so limited (that is, the generic vector-friendly instruction format 900 contemplates other sizes of the data element width field 964).

The generic vector-friendly instruction format 900 includes the following fields listed below in the order illustrated in FIG. 10*a*.

EVEX Prefix (Bytes 0-3) 1002—is encoded in a four-byte form.

Format Field 940 (EVEX Byte 0, bits [7:0])—the first byte (EVEX Byte 0) is the format field 940 and it contains 0×62 (the unique value used for distinguishing the vector-friendly instruction format in one embodiment).

The second through fourth bytes (EVEX Bytes 1-3) include a number of bit fields providing specific capability.

REX field 1005 (EVEX Byte 1, bits [7-5])—consists of an EVEX.R bit field (EVEX Byte 1, bit [7]—R), EVEX.X bit field (EVEX byte 1, bit [6]—X), and 957BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 910—this is the first part of the REX' field 910 and is the EVEX.R' bit field (EVEX Byte 1, bit [4]—R') that is used to encode either the upper 16 or lower 16 of the extended 32 register set. In one embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; other embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1015 (EVEX byte 1, bits [3:0]—mmmm)—its content encodes an implied leading opcode byte (0F, 0F 38, or 0F 3).

Data element width field 964 (EVEX byte 2, bit [7]-W)—is represented by the notation EVEX.W. EVEX.W is used to define the granularity (size) of the datatype (either 32-bit data elements or 64-bit data elements).

EVEX.vvvv 1020 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1020 encodes the 4 low-order bits of the first source register specifier stored in inverted (1s complement) form. Depending on the instruction, an extra different EVEX bit field is used to extend the specifier size to 32 registers.

EVEX.U 968 Class field (EVEX byte 2, bit [2]-U)—if EVEX.0=0, it indicates class A or EVEX.U0; if EVEX.0=1, it indicates class B or EVEX.U1.

Prefix encoding field 1025 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use an SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's programmable logic array (PLA), so the PLA can execute both the legacy and EVEX format of these legacy instructions without modification. Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 952 (EVEX byte 3, bit [7]—EH; also known as EVEX.eh, EVEX.rs, EVEX.rl, EVEX.write mask control, and EVEX.n; also illustrated with α)—as previously described, this field is context specific.

Beta field 954 (EVEX byte 3, bits [6:4]-SSS, also known as EVEX.s2-0, EVEX.r2-0, EVEX.rr1, EVEX.LL0, EVEX.LLB; also illustrated with βββ)—as previously described, this field is context specific.

REX' field 910—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 970 (EVEX byte 3, bits [2:0]-kkk)—its content specifies the index of a register in the write mask registers as previously described. In one embodiment, the specific value EVEX.kkk=000 has a special behavior implying no write mask is used for the particular instruction (this may be implemented in a variety of ways including the use of a write mask hardwired to all ones or hardware that bypasses the masking hardware).

Real opcode field 1030 (Byte 4) is also known as the opcode byte. Part of the opcode is specified in this field.

MOD R/M Field 1040 (Byte 5) includes MOD field 1042, Reg field 1044, and R/M field 1046. As previously described, the MOD field's 1042 content distinguishes between memory access and non-memory access operations. The role of Reg field 1044 can be summarized to two situations: encoding either the destination register operand or a source register operand, or be treated as an opcode extension and not used to encode any instruction operand. The role of R/M field 1046 may include the following: encoding the instruction operand that references a memory address, or encoding either the destination register operand or a source register operand.

SIB Byte (Byte 6)—as previously described, the scale field's 950 content is used for memory address generation. SIB.xxx 1054 and SIB.bbb 1056—the contents of these fields have been previously referred to with regard to the register indexes Xxxx and Bbbb.

Displacement field 962A (Bytes 7-10)—when MOD field 1042 contains 10, bytes 7-10 are the displacement field 962A, and it works the same as the legacy 32-bit displacement (disp32) and works at byte granularity.

Displacement factor field 962B (Byte 7)—when MOD field 1042 contains 01, byte 7 is the displacement factor field 962B. The location of this field is the same as that of the legacy x86 instruction set 8-bit displacement (disp8), which works at byte granularity. Since disp8 is sign extended, it can only address between 128 and 127-byte offsets; in terms of 64 byte cache lines, disp8 uses 8 bits that can be set to only four really useful values –128, –64, 0, and 64; since a greater range is often needed, disp32 is used; however, disp32 requires 4 bytes. In contrast to disp8 and disp32, the displacement factor field 962B is a reinterpretation of disp8; when using displacement factor field 962B, the actual displacement is determined by the content of the displacement factor field multiplied by the size of the memory operand access (N). This type of displacement is referred to as disp8*N. This reduces the average instruction length (a single byte used for the displacement but with a much greater range). Such compressed displacement is based on the assumption that the effective displacement is a multiple of the granularity of the memory access, and hence, the redundant low-order bits of the address offset do not need to be encoded. In other words, the displacement factor field 962B substitutes the legacy x86 instruction set 8-bit displacement. Thus, the displacement factor field 962B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 972 operates as previously described.

Full Opcode Field

Figure 10B:
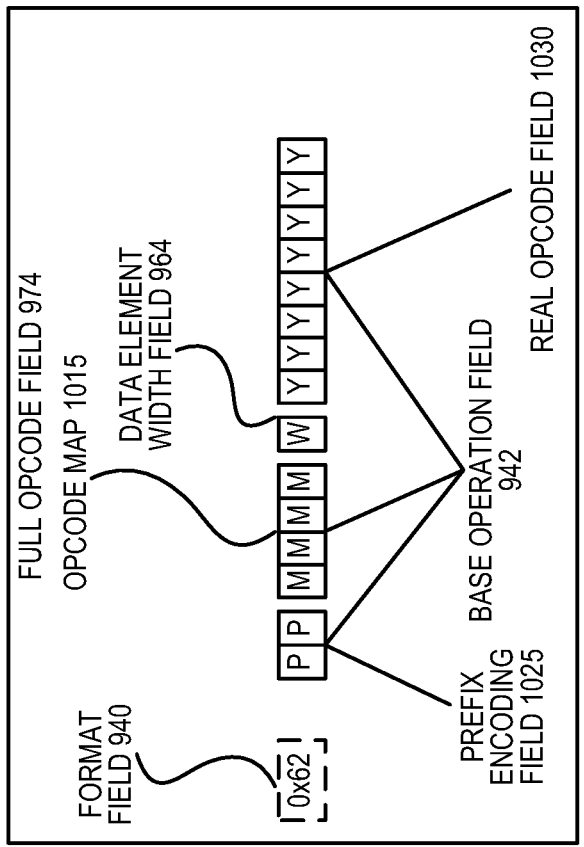

FIG. 10b is a block diagram illustrating the fields of the specific vector-friendly instruction format 1000 that make up the full opcode field 974 according to one embodiment. Specifically, the full opcode field 974 includes the format field 940, the base operation field 942, and the data element width (W) field 964. The base operation field 942 includes the prefix encoding field 1025, the opcode map field 1015, and the real opcode field 1030.

Register Index Field

Figure 10C:
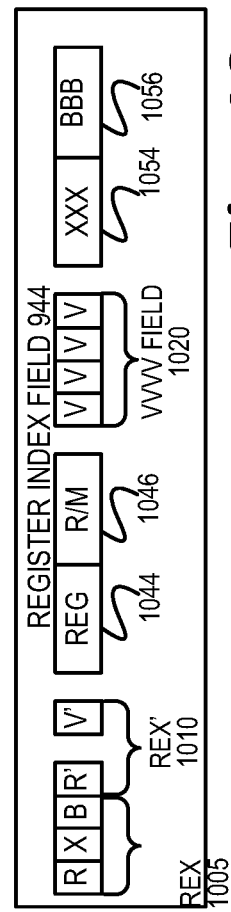

FIG. 10c is a block diagram illustrating the fields of the specific vector-friendly instruction format 1000 that make up the register index field 944 according to one embodiment. Specifically, the register index field 944 includes the REX field 1005, the REX' field 1010, the MODR/M.reg field 1044, the MODR/M.r/m field 1046, the VVVV field 1020, xxx field 1054, and the bbb field 1056.

Augmentation Operation Field

Figure 10D:
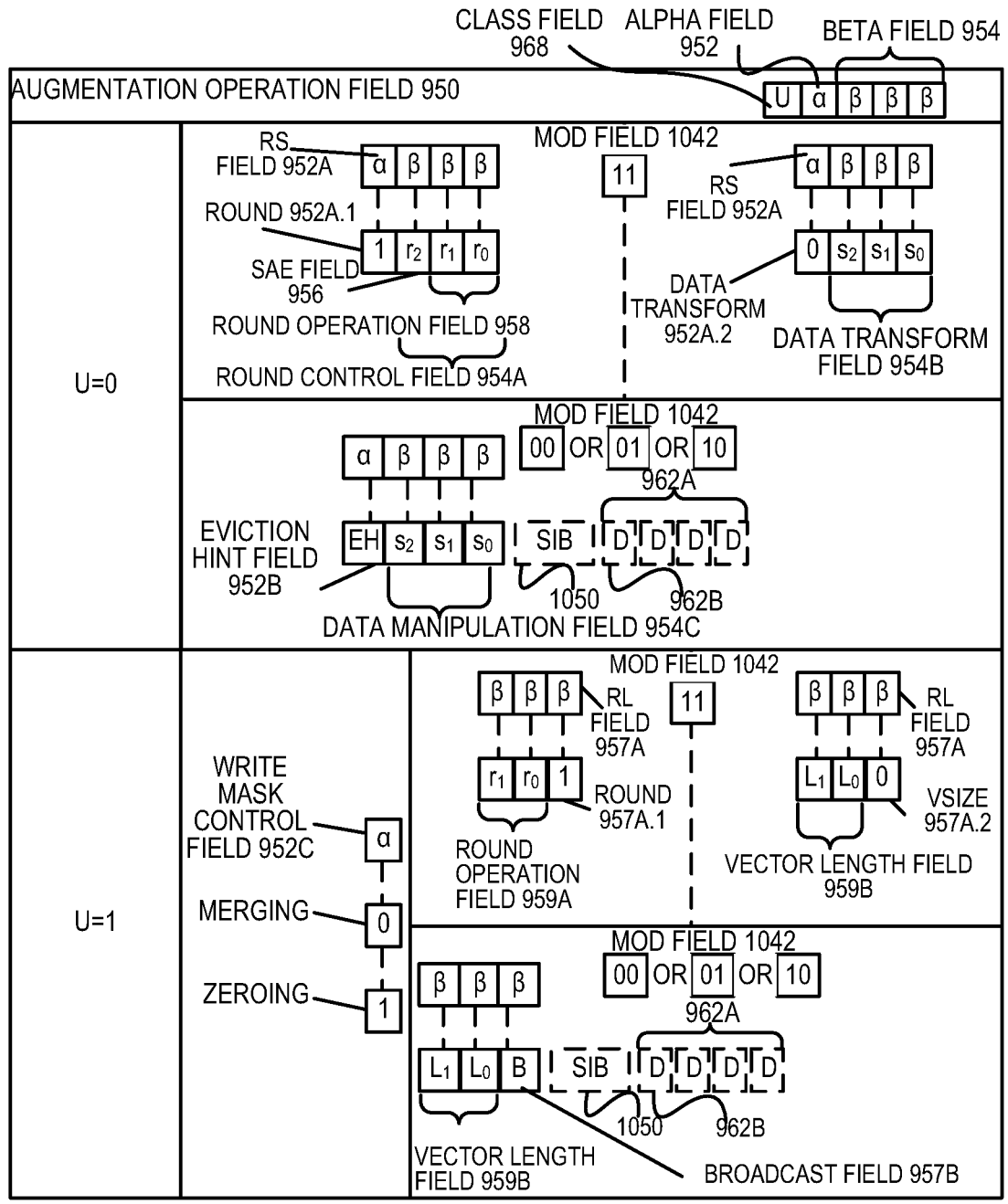

FIG. 10d is a block diagram illustrating the fields of the specific vector-friendly instruction format 1000 that make up the augmentation operation field 950 according to one embodiment. When the class (U) field 968 contains 0, it signifies EVEX.U0 (class A 968A); when it contains 1, it signifies EVEX.U1 (class B 968B). When U=0 and the MOD field 1042 contains 11 (signifying a no memory access operation), the alpha field 952 (EVEX byte 3, bit [7]—EH) is interpreted as the rs field 952A. When the rs field 952A contains a 1 (round 952A.1), the beta field 954 (EVEX byte 3, bits [6:4]—SSS) is interpreted as the round control field 954A. The round control field 954A includes a one bit SAE field 956 and a two bit round operation field 958. When the rs field 952A contains a 0 (data transform 952A.2), the beta field 954 (EVEX byte 3, bits [6:4]—SSS) is interpreted as a three bit data transform field 954B. When U=0 and the MOD field 1042 contains 00, 01, or 10 (signifying a memory access operation), the alpha field 952 (EVEX byte 3, bit [7]—EH) is interpreted as the eviction hint (EH) field 952B and the beta field 954 (EVEX byte 3, bits [6:4]—SSS) is interpreted as a three bit data manipulation field 954C.

When U=1, the alpha field 952 (EVEX byte 3, bit [7]—EH) is interpreted as the write mask control (Z) field 952C. When U=1 and the MOD field 1042 contains 11 (signifying a no memory access operation), part of the beta field 954 (EVEX byte 3, bit [4]—S0) is interpreted as the RL field 957A; when it contains a 1 (round 957A.1) the rest of the beta field 954 (EVEX byte 3, bit [6-5]—S2-1) is interpreted as the round operation field 959A, while when the RL field 957A contains a 0 (VSIZE 957.A2) the rest of the beta field 954 (EVEX byte 3, bit [6-5]—S2-1) is interpreted as the vector length field 959B (EVEX byte 3, bit [6-5]—L1-0). When U=1 and the MOD field 1042 contains 00, 01, or 10 (signifying a memory access operation), the beta field 954 (EVEX byte 3, bits [6:4]—SSS) is interpreted as the vector length field 959B (EVEX byte 3, bit [6-5]—L1-0) and the broadcast field 957B (EVEX byte 3, bit [4]—B).

Example Register Architecture

Figure 11:
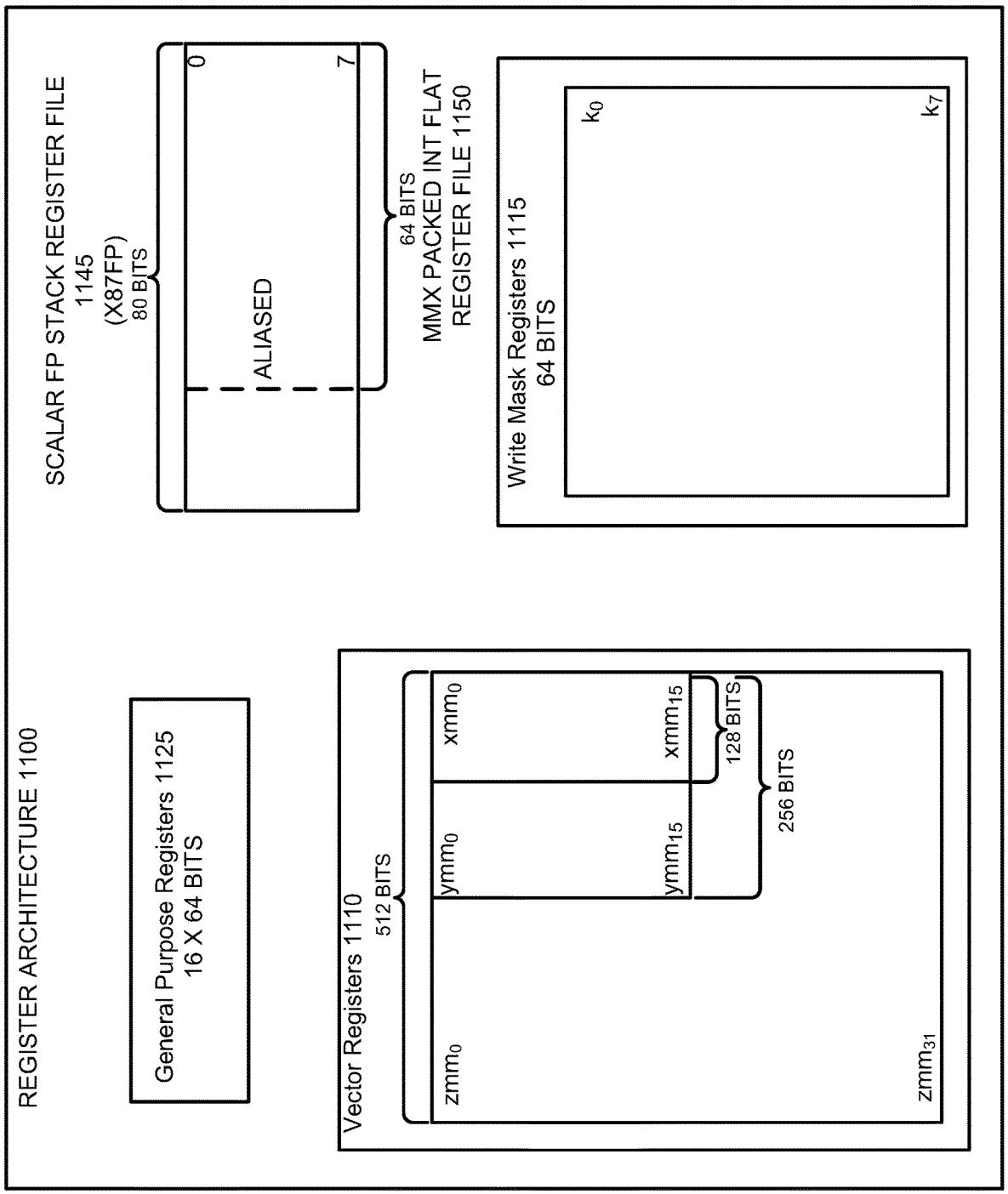
FIG. 11 is a block diagram of a register architecture, according to one or more examples of the present specification.

FIG. 11 is a block diagram of a register architecture 1100, according to one or more examples of the present specification. Embodiments of register architecture 1100 disclosed herein may be adapted or configured to provide the method of CPU hot-swapping according to the teachings of the present specification.

In the embodiment illustrated, there are 32 vector registers 1110 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

The specific vector-friendly instruction format 1000 operates on these overlaid register files as illustrated in the below tables.

| Adjustable Vector Length | Class | Operations | Registers |
|---|---|---|---|
| Instruction Templates that do not include the vector length field 959B | A (FIG. 9a; U = 0) | 910, 915, 925, 930 | zmm registers (the vector length is 64 byte) |
| | B (FIG. 9b; U = 1) | 912 | zmm registers (the vector length is 64 byte) |
| Instruction templates that do include the vector length field 959B | B (FIG. 9b; U = 1) | 917, 927 | zmm, ymm, or xmm registers (the vector length is 64 byte, 32 byte, or 16 byte) depending on the vector length field 959B |

In other words, the vector length field 959B selects between a maximum length and one or more other shorter lengths, where each such shorter length is half the length of the preceding length; and instruction templates without the vector length field 959B operate on the maximum vector length. Further, in one embodiment, the class B instruction templates of the specific vector-friendly instruction format 1000 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 1115—in the embodiment illustrated, there are 8 write mask registers (k0 through k7), each 64 bits in size. In an alternate embodiment, the write mask registers 1115 are 16 bits in size. As previously described, in one embodiment, the vector mask register k0 cannot be used as a write mask; when the encoding that would normally indicate k0 is used for a write mask, it selects a hardwired write mask of 0xFFFF, effectively disabling write masking for that instruction.

General purpose registers 1125—in the embodiment illustrated, there are sixteen 64-bit general purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1145, on which is aliased the MMX packed integer flat register file 1150—in the embodiment illustrated, the x87 stack is an eight-element stack used to perform scalar floating point operations on 32/64/80-bit floating point data using the x87 instruction set extension; while the MMX registers are used to perform operations on 64-bit packed integer data, as well as to hold operands for some operations performed between the MMX and XMM registers.

Other embodiments may use wider or narrower registers. Additionally, other embodiments may use more, less, or different register files and registers.

Example Core Architectures, Processors, and Computer Architectures

Processor cores may be implemented in different ways, for different purposes, and in different processors. For instance, implementations of such cores may include: 1) a general purpose in-order core intended for general purpose computing; 2) a high performance general purpose out-of-order core intended for general purpose computing; 3) a special purpose core intended primarily for graphics and/or scientific (throughput) computing.

Implementations of different processors may include: 1) a CPU including one or more general purpose in-order cores intended for general purpose computing and/or one or more general purpose out-of-order cores intended for general purpose computing; and 2) a coprocessor including one or more special purpose cores intended primarily for graphics and/or scientific throughput.

Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system-on-a-chip that may include on the same die the described CPU (sometimes referred to as the application core(s) or application processor(s)), the above described coprocessor, and additional functionality.

Example core architectures are described next, followed by descriptions of example processors and computer architectures.

Example Core Architectures

In-Order and Out-of-Order Core Block Diagram

FIG. 12a is a block diagram illustrating both an example in-order pipeline and an example register renaming, out-of-order issue/execution pipeline. FIG. 12b is a block diagram illustrating both an embodiment of an in-order architecture core and an example register renaming, out-of-order issue/execution architecture core to be included in a processor. Embodiments of in-order pipelines, in-order architectures, and registers disclosed herein may be adapted or configured to provide the method of CPU hot-swapping according to the teachings of the present specification.

The solid lined boxes in FIGS. 12a-12b illustrate the in-order pipeline and in-order core, while the optional addition of the dashed, lined boxes illustrates the register renaming, out-of-order issue/execution pipeline and core. Given that the in-order aspect is a subset of the out-of-order aspect, the out-of-order aspect will be described.

In FIG. 12a, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12b shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special purpose core, such as, for example, a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder) may decode instructions, and generate as an output one or more micro-operations, microcode entry points, microinstructions, other instructions, or other control signals, which are decoded from, or which otherwise reflect, or are derived from, the original instructions. The decode unit 1240 may be implemented using various different mechanisms. Examples of suitable mechanisms include, but are not limited to, look-up tables, hardware implementations, PLAs, microcode read-only memories (ROMs), etc. In one embodiment, the core 1290 includes a microcode ROM or other medium that stores microcode for certain macroinstructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservation stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

By way of example, the register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; the execution cluster 1260 performs the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instruction sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-threading technology).

While register renaming is described in the context of out-of-order execution, it should be understood that register renaming may be used in an in-order architecture. While the illustrated embodiment of the processor also includes separate instruction and data cache units 1234/1274 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Example In-Order Core Architecture

FIGS. 13a-13b illustrate a block diagram of a more specific example in-order core architecture, which core would be one of several logic blocks (including other cores of the same type and/or different types) in a chip. Embodiments of in-order architectures disclosed herein may be adapted or configured to provide the method of CPU hot-swapping according to the teachings of the present specification.

The logic blocks communicate through a high-bandwidth interconnect network (e.g., a ring network) with some fixed function logic, memory IO interfaces, and other necessary IO logic, depending on the application.

FIG. 13a is a block diagram of a single processor core, along with its connection to the on-die interconnect network 1302 and with its local subset of the Level 2 (L2) cache 1304, according to one or more examples of the present specification. In one embodiment, an instruction decoder 1300 supports the x86 instruction set with a packed data instruction set extension. An L1 cache 1306 allows low-latency accesses to cache memory into the scalar and vector units. While in one embodiment (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, other embodiments may use a different approach (e.g., use a single register set or include a communication path that allows data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 13b is an expanded view of part of the processor core in FIG. 13a, according to one or more examples of the present specification. FIG. 13b includes an L1 data cache 1306A, part of the L1 cache 1304, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
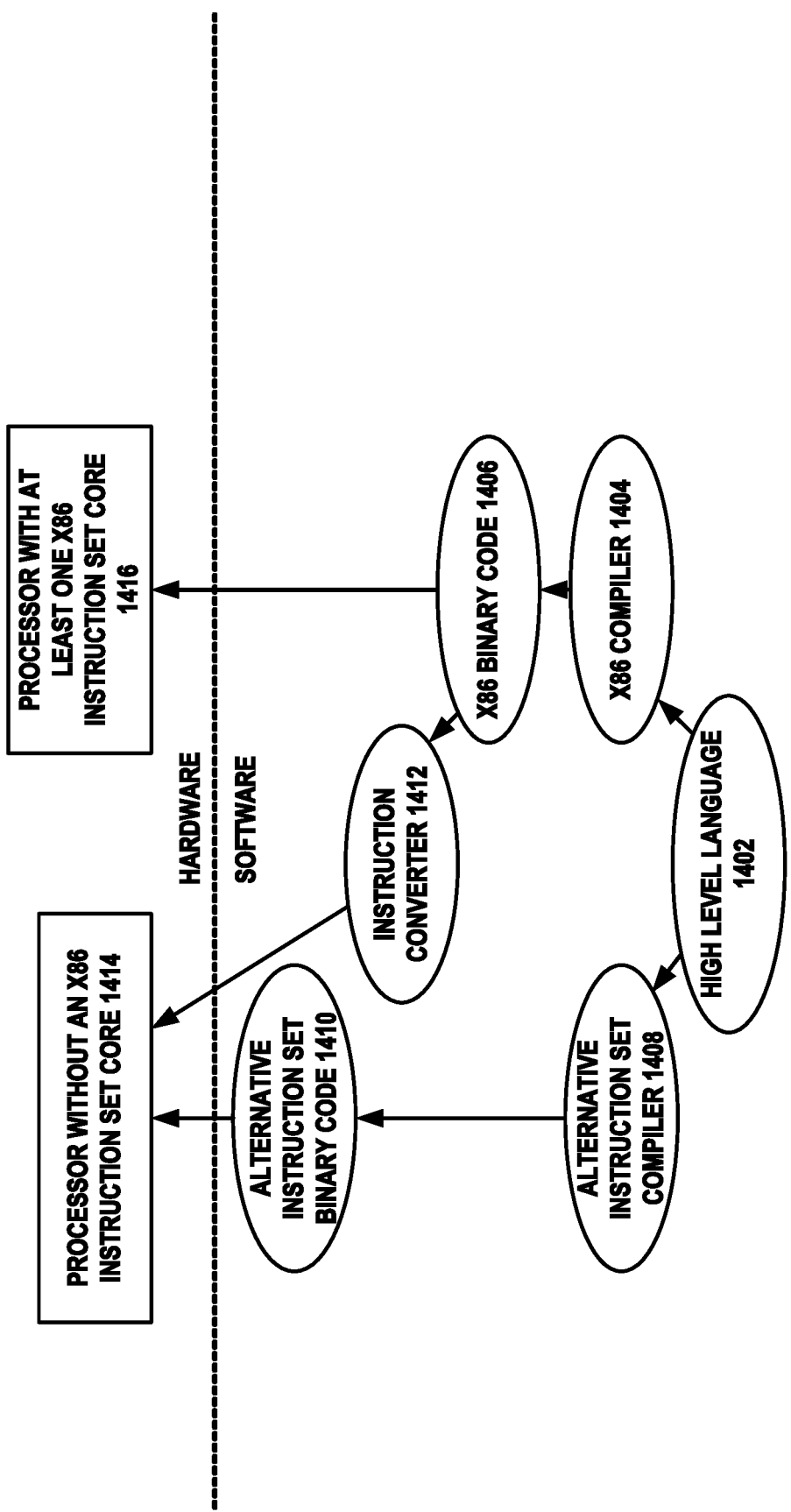
FIG. 14 is a block diagram contrasting the use of a software instruction converter to convert binary instructions in a source instruction set to binary instructions in a target instruction set, according to one or more examples of the present specification.

FIG. 14 is a block diagram contrasting the use of a software instruction converter to convert binary instructions in a source instruction set to binary instructions in a target instruction set, according to one or more examples of the present specification. Embodiments of the software instruction converter disclosed herein may be adapted or configured to provide the method of CPU hot-swapping according to the teachings of the present specification.

In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code may accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of nonlimiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the FIGURES may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of nonlimiting example, an optical drive (e.g., CD/DVD/Blu-Ray), a hard drive, a solid state drive, a flash memory, or other nonvolatile medium. A computer-readable medium could also include a medium such as a read-only memory (ROM), an FPGA or ASIC configured to carry out the desired instructions, stored instructions for programming an FPGA or ASIC to carry out the desired instructions, an IP block that can be integrated in hardware into other circuits, or instructions encoded directly into hardware or microcode on a processor such as a microprocessor, DSP, microcontroller, or in any other suitable component, device, element, or object where appropriate and based on particular needs. A non-transitory storage medium herein is expressly intended to include any non-transitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a nonlimiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a CPU package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner.

Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a multi-core computing system configured to provide a hot-swappable CPU0, comprising: a first CPU in a first CPU socket and a second CPU in a second CPU socket; a switch comprising a first media interface to the first CPU socket and a second media interface to the second CPU socket; and one or more mediums comprising non-transitory instructions to detect a hot swap event of the first CPU, designate the second CPU as CPU0, determine that a new CPU has replaced the first CPU, operate the switch to communicatively couple the new CPU to a backup initialization code store via the first media interface, initialize the new CPU, and designate the new CPU as CPUN, wherein N≠0.

Example 2 includes the multi-core computing system of example 1, wherein the media interface is a direct media interface (DMI), and wherein the switch is a DMI switch.

Example 3 includes the multi-core computing system of example 2, wherein the switch comprises a switching DMI fabric.

Example 4 includes the multi-core computing system of example 1, further comprising a message channel routing table to control media interface routing within the switch.

Example 5 includes the multi-core computing system of example 4, further comprising a baseboard management controller (BMC) to program the message channel routing table.

Example 6 includes the multi-core computing system of example 5, wherein programming the message channel routing table comprises placing all or part of the system into a quiescent state.

Example 7 includes the multi-core computing system of example 1, further comprising a first chipset, wherein the instructions are further to operate the switch to communicatively couple the second CPU to the first chipset.

Example 8 includes the multi-core computing system of example 6, further comprising a second chipset, wherein the first and second chipsets are platform controller hub (PCH) circuits.

Example 9 includes the multi-core computing system of example 7, wherein the PCH circuit comprises limited PCH functionality.

Example 10 includes the multi-core computing system of example 7, wherein the first and second PCH circuits comprise at least one configurable logic circuit.

Example 11 includes the multi-core computing system of example 1, wherein the initialization code comprises operating system boot code.

Example 12 includes the multi-core computing system of example 1, wherein initializing the new CPU comprises initializing without SMI slicing.

Example 13 includes a system-on-a-chip (SoC) comprising the computing apparatus of any of examples 1-12.

Example 14 includes a computing apparatus, comprising: a hardware platform comprising a first central processor unit (CPU) in a CPU0 configuration and a second CPU in a CPUN configuration wherein N≠0; a first boot store and a second boot store, the first and second boot stores comprising substantially identical instructions to initialize a CPU; a switch comprising a first media interface to the first CPU and a second media interface to the second CPU, and switching logic to communicatively couple the switch to the first and second boot stores; and instructions encoded on a tangible and non-transitory medium to instruct the hardware platform to: determine that the first CPU is to be hot swapped; designate the second CPU as CPU0; operate the switch to communicatively couple the first CPU socket to the second boot store via the second media interface, and to communicatively couple the second CPU socket to the first boot store via the first media interface; determine that a new CPU has replaced the first CPU; and initialize the new CPU comprising retrieving the instructions to initialize the CPU from the first boot store via the first media interface.

Example 15 includes the computing apparatus of example 14, wherein the media interface is a direct media interface (DMI), and wherein the switch is a DMI switch.

Example 16 includes the computing apparatus of example 15, wherein the switch comprises a switching DMI fabric.

Example 17 includes the computing apparatus of example 14, further comprising a message channel routing table to control media interface routing within the switch.

Example 18 includes the computing apparatus of example 17, further comprising a baseboard management controller (BMC) to program the message channel routing table.

Example 19 includes the computing apparatus of example 18, wherein programming the message channel routing table comprises placing all or part of the system into a quiescent state.

Example 20 includes the computing apparatus of example 19, further comprising a first chipset, wherein the instructions are further to operate the switch to communicatively couple the second CPU to the first chipset.

Example 21 includes the computing apparatus of example 20, further comprising a second chipset, wherein the first and second chipsets are platform controller hub (PCH) circuits.

Example 22 includes the computing apparatus of example 20, wherein the PCH circuit comprises limited PCH functionality.

Example 23 includes the computing apparatus of example 20, wherein the PCH circuit comprises at least one configurable logic circuit.

Example 24 includes the computing apparatus of example 14, wherein the initialization code comprises operating system boot code.

Example 25 includes the computing apparatus of example 14, wherein initializing the new CPU comprises initializing without SMI slicing.

Example 26 includes a system-on-a-chip (SoC) comprising the computing apparatus of any of examples 14-25.

Example 27 includes a DMI switch, comprising: a first CPU interface to communicatively couple to a first CPU socket; a second CPU interface to communicatively couple to a second CPU socket; a media interface to communicatively couple to a media store; and a non-transitory instruction store comprising instructions to: receive an instruction that a CPU0 of the first CPU socket is to be hot swapped; operate switching circuitry to communicatively couple the second CPU socket to the first CPU interface and communicatively couple the first CPU socket to the second CPU interface; receive CPU initialization code via the media interface; and send the CPU initialization code to a CPU of the second CPU socket via the first CPU interface.

Example 28 includes the DMI switch of example 27, further comprising a message channel routing table to control media interface routing within the DMI switch.

Example 29 includes the DMI switch of example 28, further comprising a baseboard management controller (BMC) interface, wherein the instructions are further configured to receive instructions, via the BMC interface, to reprogram the message channel routing table.

Example 30 includes the DMI switch of example 27, wherein the DMI switch is an FPGA.

Example 31 includes the DMI switch of example 27, wherein the DMI switch is an IP block.

Example 32 includes the DMI switch of example 27, wherein the DMI switch is an ASIC.

Example 33 includes the DMI switch of example 27, wherein the DMI switch is a programmable fabric.

Example 34 includes an SoC comprising the DMI switch of any of examples 27-33.

Example 35 includes a method of hot-swapping a CPU0, comprising: detecting a hot swap event for a first CPU in a first CPU socket, wherein the first CPU is designated CPU0; designating a second CPU in a second CPU socket as CPU0; operating a media interface switch to communicatively couple the first CPU socket to a first boot code store via a first media interface; determining that a new CPU populates the first CPU socket; and booting the new CPU with information from the first boot code store.

Example 36 includes the method of example 35, wherein the media interface is a direct media interface (DMI), and wherein the switch is a DMI switch.

Example 37 includes the method of example 36, wherein the switch comprises a switching DMI fabric.

Example 38 includes the method of example 35, further comprising manipulating a message channel routing table to control media interface routing within the switch.

Example 39 includes the method of example 38, wherein manipulating the message channel routing table comprises operating a baseboard management controller (BMC) to program the message channel routing table.

Example 40 includes the method of example 39, wherein programming the message channel routing table comprises placing all or part of a host system into a quiescent state.

Example 41 includes the method of example 40, further comprising interfacing with the boot code via a first chipset.

Example 42 includes the method of example 41, further comprising interfacing with a second chipset, wherein the first and second chipsets are platform controller hub (PCH) circuits.

Example 43 includes the method of example 42, wherein the PCH circuit comprises limited PCH functionality.

Example 44 includes the method of example 41, wherein the PCH circuit comprises at least one configurable logic circuit.

Example 45 includes the method of example 35, wherein the initialization code comprises operating system boot code.

Example 46 includes the method of example 35, wherein initializing the new CPU comprises initializing without SMI slicing.

Example 47 includes an apparatus comprising means for performing the method of any of examples 35-46.

Example 48 includes the apparatus of example 47, wherein the means for performing the method comprise a processor and a memory.

Example 49 includes the apparatus of example 47, wherein the memory comprises machine-readable instructions, that when executed cause the apparatus to perform the method of any of examples 35-46.

Example 50 includes the apparatus of any of examples 47-49, wherein the apparatus is a computing system.

Example 51 includes at least one computer-readable medium comprising instructions that, when executed, implement a method or realize an apparatus as illustrated in any of examples 35-50.

Example 52 includes one or more tangible, non-transitory computer-readable mediums having stored thereon instructions for providing a hot-swappable CPU0, the instructions to instruct a computing system to: detect a hot swap event for a first CPU in a first CPU socket, wherein the first CPU is designated CPU0; designate a second CPU in a second CPU socket as CPU0; operate a media interface switch to communicatively couple the first CPU socket to a first boot code store via a first media interface; determine that a new CPU populates the first CPU socket; and boot the new CPU with information from the first boot code store.

Example 53 includes the one or more tangible, non-transitory computer-readable mediums of example 52, wherein the media interface is a direct media interface (DMI), and wherein the switch is a DMI switch.

Example 54 includes the one or more tangible, non-transitory computer-readable mediums of example 53, wherein the switch comprises a switching DMI fabric.

Example 55 includes the one or more tangible, non-transitory computer-readable mediums of example 52, wherein the instructions are further to instruct the computing system to manipulate a message channel routing table to control media interface routing within the switch.

Example 56 includes the one or more tangible, non-transitory computer-readable mediums of example 55, wherein manipulating the message channel routing table comprises operating a baseboard management controller (BMC) to program the message channel routing table.

Example 57 includes the one or more tangible, non-transitory computer-readable mediums of example 56, wherein programming the message channel routing table comprises placing all or part of a host system into a quiescent state.

Example 58 includes the one or more tangible, non-transitory computer-readable mediums of example 57, wherein the instructions are further to instruct the computing system to interface with the boot code via a first chipset.

Example 59 includes the one or more tangible, non-transitory computer-readable mediums of example 58, wherein the instructions are further to instruct the computing system to interface with a second chipset, wherein the first and second chipsets are platform controller hub (PCH) circuits.

Example 60 includes the one or more tangible, non-transitory computer-readable mediums of example 59, wherein the PCH circuit comprises limited PCH functionality.

Example 61 includes the one or more tangible, non-transitory computer-readable mediums of example 60, wherein the PCH circuit comprises at least one configurable logic circuit.

Example 62 includes the one or more tangible, non-transitory computer-readable mediums of example 52, wherein the initialization code comprises operating system boot code.

Example 63 includes the one or more tangible, non-transitory computer-readable mediums of example 52, wherein initializing the new CPU comprises initializing without SMI slicing.

What is claimed is:

1. A multi-core computing system configured to provide a hot-swappable CPU0, comprising:
a first CPU in a first CPU socket and a second CPU in a second CPU socket;
a switch comprising a first media interface to the first CPU socket and a second media interface to the second CPU socket; and
one or more non-transitory mediums including instructions, that when executed, cause the multi-core computing system to detect a hot swap event of the first CPU, designate the second CPU as CPU0, determine that a new CPU has replaced the first CPU, operate the switch to communicatively couple the new CPU to a backup initialization code store via the first media interface, initialize the new CPU, and designate the new CPU as CPUN, wherein N≠0.

2. The multi-core computing system of claim 1, wherein the first media interface is a first direct media interface (DMI) and the second media interface is a second DMI, and wherein the switch is a DMI switch.

3. The multi-core computing system of claim 2, wherein the switch comprises a switching DMI fabric.

4. The multi-core computing system of claim 1, further comprising a message channel routing table to control media interface routing within the switch.

5. The multi-core computing system of claim 4, further comprising a baseboard management controller (BMC) to program the message channel routing table.

6. The multi-core computing system of claim 5, wherein programming the message channel routing table comprises placing all or part of the multi-core computing system into a quiescent state.

7. The multi-core computing system of claim 1, further comprising a first chipset, wherein the instructions are further to cause the multi-core computing system to operate the switch to communicatively couple the second CPU to the first chipset.

8. The multi-core computing system of claim 7, further comprising a second chipset, wherein the instructions are further to cause the multi-core computing system to operate the switch to communicatively couple the new CPU to the second chipset and wherein the first and second chipsets are platform controller hub (PCH) circuits.

9. The multi-core computing system of claim 8, wherein the PCH circuits comprise limited PCH functionality.

10. The multi-core computing system of claim 8, wherein the first and second PCH circuits comprise at least one configurable logic circuit.

11. The multi-core computing system of claim 1, wherein the instructions are further to cause the multi-core computing system to provide dynamic partitioning.

12. The multi-core computing system of claim 1, wherein the backup initialization code comprises operating system boot code.

13. The multi-core computing system of claim 1, wherein initializing the new CPU comprises initializing without SMI slicing.

14. A computing apparatus, comprising:
- a hardware platform comprising a first central processor unit (CPU) in a CPUO configuration and a second CPU in a CPUN configuration wherein N≠0;
- a first boot store and a second boot store, the first and second boot stores comprising substantially identical instructions to initialize a CPU;
- a switch comprising a first media interface to the first CPU and a second media interface to the second CPU, and switching logic to communicatively couple the switch to the first and second boot stores; and
- instructions encoded on a tangible and non-transitory medium to instruct the hardware platform to:
  - determine that the first CPU is to be hot swapped;
  - designate the second CPU as CPU0;
  - operate the switch to communicatively couple the first CPU to the second boot store via the second media interface, and to communicatively couple the second CPU to the first boot store via the first media interface;
  - determine that a new CPU has replaced the first CPU; and
  - initialize the new CPU comprising retrieving instructions to initialize the new CPU from the first boot store via the first media interface.

15. The computing apparatus of claim 14, further comprising a baseboard management controller (BMC) to program a message channel routing table.

16. The computing apparatus of claim 15, wherein programming the message channel routing table comprises placing all or part of the hardware platform into a quiescent state.

17. The computing apparatus of claim 16, further comprising a first chipset, wherein the instructions are further to instruct the hardware platform to operate the switch to communicatively couple the second CPU to the first chipset.

18. The computing apparatus of claim 17, further comprising a second chipset, wherein the first and second chipsets are platform controller hub (PCH) circuits.

19. A method of hot-swapping a CPUO, comprising:
- detecting a hot swap event for a first CPU in a first CPU socket, wherein the first CPU is designated CPU0;
- designating a second CPU in a second CPU socket as CPUN, where N≠0;
- operating a media interface switch to communicatively couple the first CPU to a first boot code store via a media interface;
- determining that a new CPU populates the first CPU socket; and
- booting the new CPU with information from the first boot code store.

20. The method of claim 19, wherein the media interface is a direct media interface (DMI), and wherein the media interface switch is a DMI switch comprising a switching DMI fabric.

21. At least one non-transitory computer-readable storage medium, comprising a plurality of instructions, that when executed by a multi-core computing system, cause the multi-core computing system to:
- detect a hot swap event for a first CPU in a first CPU socket, wherein the first CPU is designated CPU0;
- designate a second CPU in a second CPU socket as CPUN, where N≠0;
- operate a media interface switch to communicatively couple the first CPU to a first boot code store via a media interface;
- determine that a new CPU populates the first CPU socket; and
- boot the new CPU with information from the first boot code store.

22. The at least one non-transitory computer-readable storage medium of claim 21, wherein the media interface is a direct media interface (DMI), and wherein the media interface switch is a DMI switch comprising a switching DMI fabric.

* * * * *

UNITED STATES PATENT AND TRADEMARK OFFICE
CERTIFICATE OF CORRECTION

PATENT NO. : 11,327,918 B2
APPLICATION NO. : 17/041519
DATED : May 10, 2022
INVENTOR(S) : Zhi Yong Chen et al.

It is certified that error appears in the above-identified patent and that said Letters Patent is hereby corrected as shown below:

In the Claims

Column 44 Lines 6-18 Claim 19 should be corrected to read:
A method of hot-swapping a CPU0, comprising:
    detecting a hot swap event for a first CPU in a first CPU socket, wherein the first CPU is designated CPU0;
    designating a second CPU in a second CPU socket as CPUN, where $N \neq 0$;
    operating a media interface switch to communicatively couple the first CPU to a first boot code store via a media interface;
    determining that a new CPU populates the first CPU socket; and
    booting the new CPU with information from the first boot code store.

Signed and Sealed this
Ninth Day of August, 2022

Katherine Kelly Vidal
*Director of the United States Patent and Trademark Office*